(12) United States Patent
Markulec et al.

(10) Patent No.: US 6,302,141 B1
(45) Date of Patent: Oct. 16, 2001

(54) BUILDING BLOCKS FOR INTEGRATED GAS PANEL

(75) Inventors: Jeffrey R. Markulec, San Jose; Dennis G. Rex, Sunnyvale; Richard E. Schuster, Milpitas; Brent D. Elliot, Cupertino, all of CA (US)

(73) Assignee: Insync Systems, Inc., Milpitas, CA (US)

( * ) Notice: Subject to any disclaimer, the term of this patent is extended or adjusted under 35 U.S.C. 154(b) by 0 days.

(21) Appl. No.: 08/931,060

(22) Filed: Sep. 15, 1997

Related U.S. Application Data

(63) Continuation-in-part of application No. 08/760,150, filed on Dec. 3, 1996, now Pat. No. 5,836,355.

(51) Int. Cl.[7] ..................... F16K 11/22
(52) U.S. Cl. ............ 137/269; 137/884; 137/271
(58) Field of Search .................. 137/884, 269, 137/271

(56) References Cited

U.S. PATENT DOCUMENTS

| | | |
|---|---|---|
| 3,572,368 | 3/1971 | Bullmer . |
| 3,863,666 | 2/1975 | Bonne et al. . |
| 3,915,194 | 10/1975 | Friedrich . |
| 3,934,605 | 1/1976 | Legris . |
| 4,082,324 | 4/1978 | Obrecht . |
| 4,168,724 | 9/1979 | Graffunder et al. . |
| 4,524,807 | 6/1985 | Toliusis . |
| 4,657,047 | 4/1987 | Kolibas . |
| 4,848,393 | 7/1989 | West . |
| 5,178,191 | 1/1993 | Schaefer . |
| 5,301,717 | 4/1994 | Goedecke . |
| 5,368,062 | 11/1994 | Okumura et al. . |
| 5,439,026 | 8/1995 | Moriya et al. . |
| 5,642,756 | * 7/1997 | Lawrence et al. ........ 137/884 |
| 5,662,143 | 9/1997 | Caughran . |
| 5,730,181 | 3/1998 | Doyle et al. . |
| 5,749,562 | 5/1998 | Möller et al. . |
| 5,769,110 | * 6/1998 | Ohmi et al. ............. 137/269 |
| 5,803,507 | 9/1998 | Vu . |
| 5,836,355 | * 11/1998 | Markulec et al. ........ 137/269 X |
| 5,950,661 | * 9/1999 | Kirchhoff-Stewens ..... 137/269 |
| 5,992,463 | 11/1999 | Redemann et al. . |

FOREIGN PATENT DOCUMENTS

| | | |
|---|---|---|
| 27 38 027 | 3/1978 | (DE) . |
| 2250907A1 | 6/1975 | (FR) . |
| WO 95/10001 | 4/1995 | (WO) . |
| WO 96/29529 | 9/1996 | (WO) . |

OTHER PUBLICATIONS

"The World Standard for Ultra Clean Gas Delivery Systems and Components", by Ultra Clean Technology Systems & Service, Inc.

\* cited by examiner

*Primary Examiner*—Kevin Lee
(74) *Attorney, Agent, or Firm*—Wolf, Greenfield & Sacks, P.C.

(57) ABSTRACT

A gas panel comprising a plurality of discreet blocks. The gas panel of the present invention includes a first functional component coupled to a first face of a first block wherein the first face has a first port configuration. A second functional component coupled to a first face of a second block wherein the first face of the second block has the first port configuration and wherein the first functional component is different than the second functional component.

99 Claims, 22 Drawing Sheets

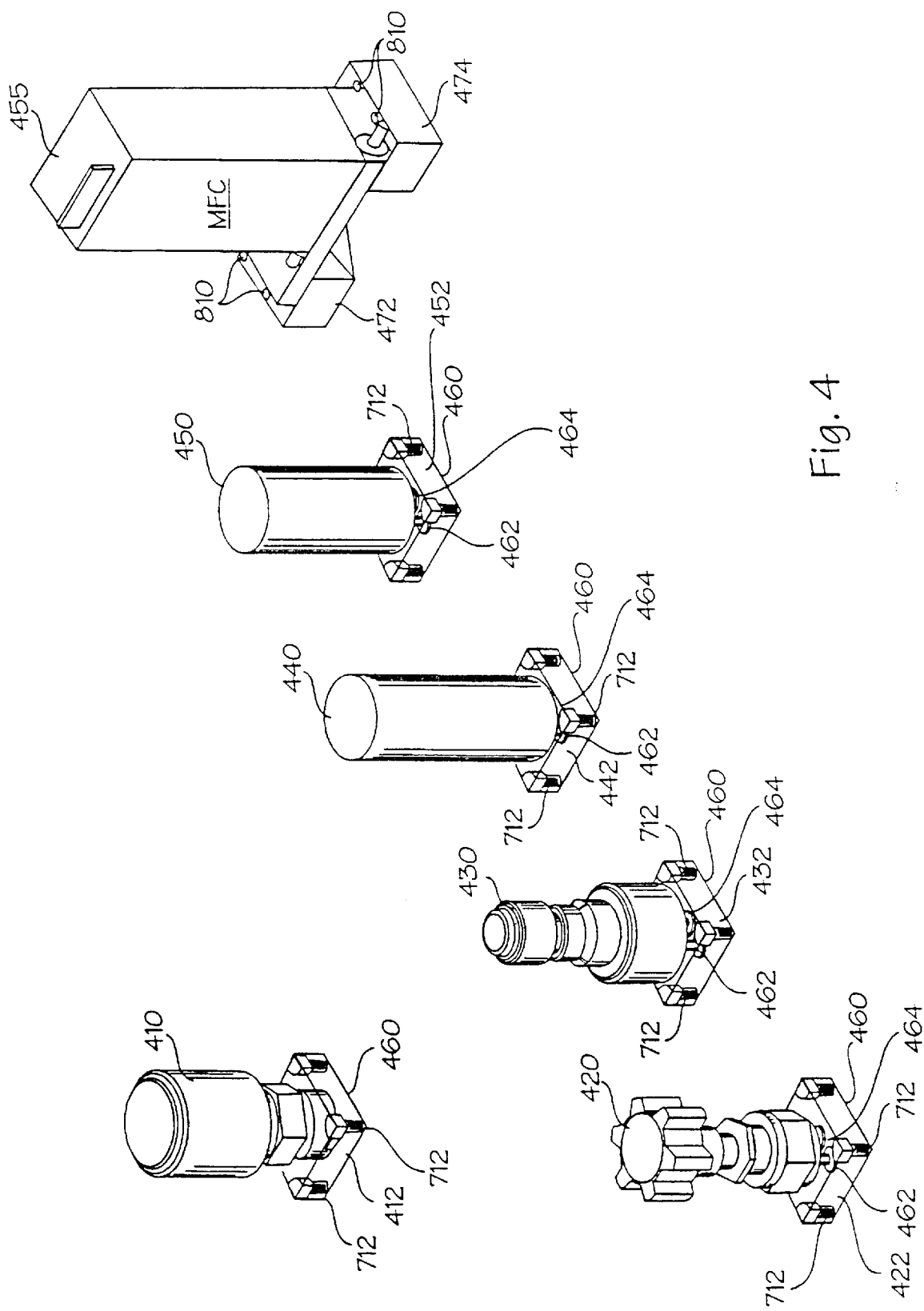

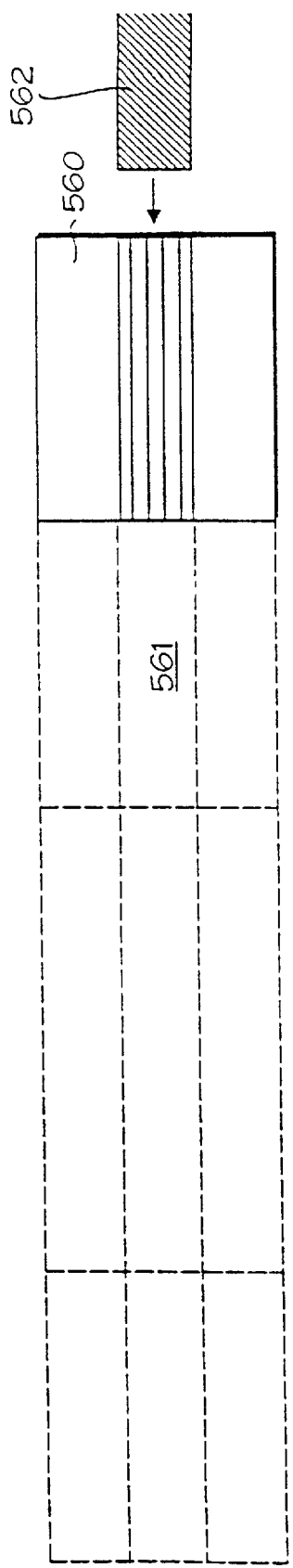
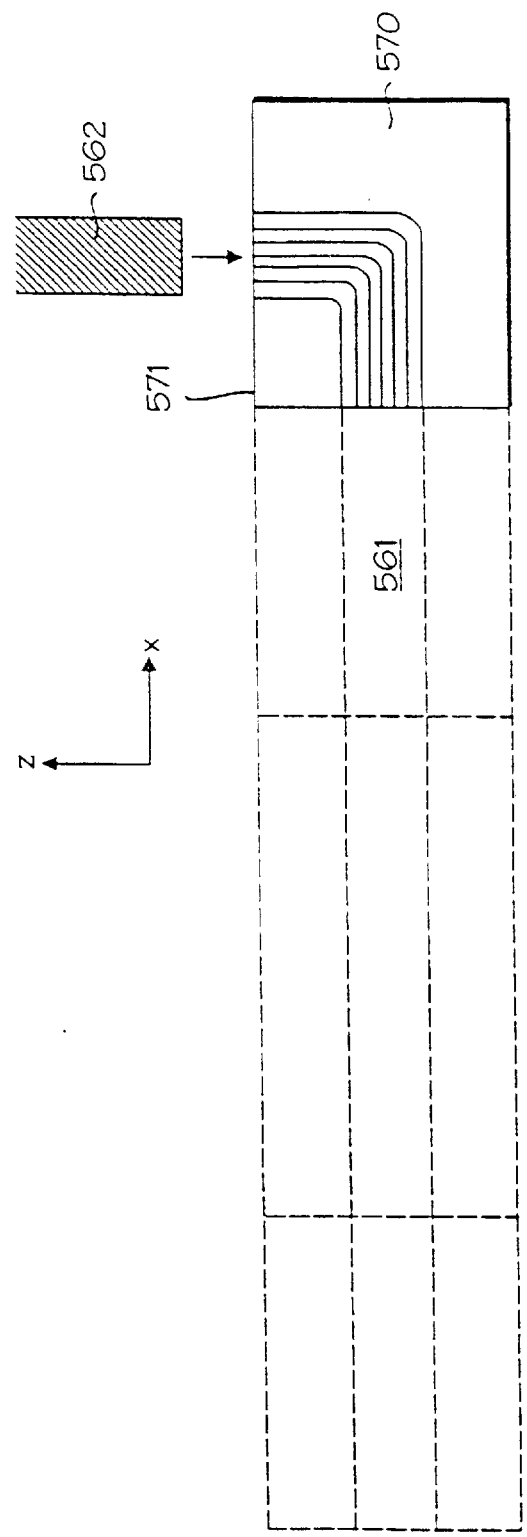
Fig. 5f
Fig. 5g

BUILDING BLOCKS FOR INTEGRATED GAS PANEL

The present application is a continuation-in-part of U.S. patent application Ser. No. 08/760,150, which was filed on Dec. 3, 1996, U.S. Pat. No. 5,836,355 and is assigned to the assignee of the present application.

BACKGROUND OF THE INVENTION

1. Field of the Invention

The present invention relates to the field of gas delivery systems, and more specifically to a gas panel comprising a plurality of blocks which provide the gas routing conduits and passages for the panel.

2. Discussion of Related Art

Gas panels are used to control the flow of gases and gas mixtures in many manufacturing processes and machinery. A typical gas panel, such as gas panel 100 shown in FIG. 1, is made up of literally hundreds of discreet or individual components, such as valves 102, filters 104, flow regulators 106, pressure regulators 107, pressure transducers 109, and connections 108, connected together by tens (or hundred) of feet of tubing 110. Gas panels are designed to provide desired functions, such as mixing and purging, by uniquely configuring the various discreet components.

A problem with present gas panels is that most of them are uniquely designed and configured to meet specific needs. Today there is simply no standard design in which gas panels are configured. Today it takes weeks to months to design a gas panel, fabricate all subassemblies, and then assemble the final product. Uniquely designing or configuring each new gas panel costs time and money. Additionally, the lack of a standard design makes it difficult for facilities' personnel to maintain, repair, and retrofit all the differently designed gas panels which may exist in a single facility. The unique designs make spare parts inventory management cumbersome and expensive.

Another problem with present gas panels is a large number of fittings 108 and welds required to interconnect all of the functional components. When tubes are welded to fittings 108, the heat generated during the welding process physically and chemically degrades the electropolish of the portion of the tube near the weld (i.e., the heat affected zone). The degraded finish of the heat affected zone can then be a substantial source of contaminant generation. Additionally, during the welding process metal vapor, such as manganese, can condense in the cooler portions of the tube and form deposits therein. Also, if elements being welded have different material composition (e.g., stainless steel with inconel), desired weld geometry and chemical properties are difficult to achieve. Thus, gas panels with large numbers of fittings and welds are incompatible with ultra clean gas systems which require extremely low levels of contaminants and particles. Additionally, high purity fittings 108 are expensive and can be difficult to obtain, thereby increasing the cost of any gas panel incorporating them.

Yet another problem associated with present gas panel designs is the large amount of tubing 110 used to route gas throughout the gas panel. Large volumes of tubing require large volumes of gas to fill the system and make it difficult to stabilize and control gas flows. Additionally, gas panels with excessive tubing require significant amounts of time to purge and isolate which can result in expensive downtime of essential manufacturing equipment, resulting in an increase in the cost of ownership. Still further, the more tubing a gas panel has, the more "wetted surface area" it has, which increases its likelihood of being a source of contamination in a manufacturing process.

Thus, what is desired is a rapidly configurable and easily reconfigurable gas panel which reduces or eliminates the number of welds, fixtures and tubing incorporated therein.

SUMMARY OF THE INVENTION

The present invention is a set of uniquely ported and passage routed base blocks and manifold blocks which can be coupled together to form a weldless and tubeless gas panel capable of all ultra high purity functions and capabilities. Base blocks of the present invention may include an identical component interconnection face for mounting a functional component (e.g., a valve, pressure transducer, regulator, a filter, etc.). Additionally, many functional components include an identical base interconnection face so that many components of the present invention can be attached to a number of different base blocks. Additionally, each base block includes identical conduit interconnection faces so that ports of adjacent base blocks can be coupled together to form a common conduit or gas stick. Additionally, the present invention includes a plurality of manifold blocks which have identical manifold interconnection faces which allow manifold blocks to be coupled together in a direction transverse to the coupling of base blocks in order to generate a common manifold which can be used to route gas between the various conduits (gas sticks) formed by coupling base blocks. Additional features and capabilities of the present invention will become evident from the detailed description which follows.

BRIEF DESCRIPTION OF THE DRAWINGS

FIG. 4 is an illustration of a plurality of functional components utilized in the present invention.

FIG. 5f is an illustration of a first end plate block.

FIG. 5g is an illustration of a second end plate block.

DETAILED DESCRIPTION OF THE PRESENT INVENTION

Figure 1:
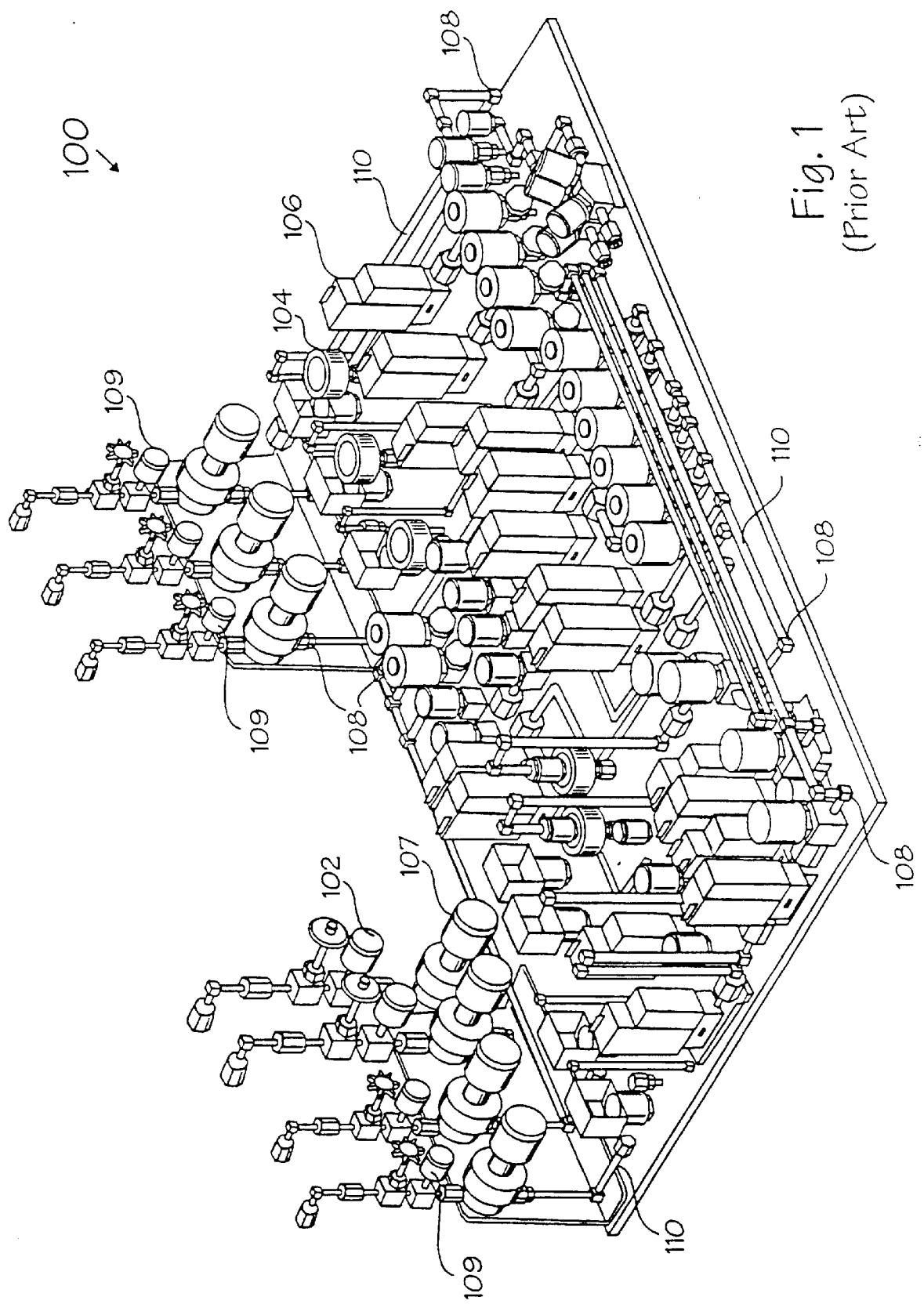
FIG. 1 is an illustration of a standard gas panel which utilizes tubing and welds to interconnect the various functional components.

The present invention describes a novel set of building blocks which can be interconnected together to form a gas panel having a variety of different functions and capabilities. In the following description numerous specific details are set forth, such as particular fixtures, components, and block designs, in order to provide a thorough understanding of the present invention. It will be obvious, however, to one skilled in the art that the present invention may be practiced without these specific details. In other instances well known mechanical assembly, machining and manufacturing techniques have not been set forth in particular detail in order to not unnecessarily obscure the present invention.

The present invention is a set of uniquely ported discrete building blocks which, when interconnected together, form all of the conduit and manifold routing required for a complete gas panel. The building blocks can be coupled together to form gas panels, such as gas panel 200 shown in FIG. 2, which can provide all of the different functions and capabilities such as, but not limited to, mixing, premixing, purging, sampling and venting, required of current gas panels. Gas panel 200 shown in FIG. 2 includes a plurality of base blocks 202 which have a standard component interconnection face which can be used to attach any single component such as a valve, filter, pressure transducer, pressure regulator, etc. A plurality of base blocks are coupled together to form a common conduit or gas stick. A plurality of manifold blocks 204 are coupled together in a direction transverse to the coupling of the base blocks to form a common manifold or passage, which runs transverse to the conduits or gas sticks formed by coupled adjacent base blocks. The manifold blocks are coupled to the under side of base blocks (i.e., to the side opposite to the side on which the component 206 is mounted) and allow for fluid communication between the individual gas sticks. The common passage or manifold generated by coupling manifold blocks together can be used to mix, premix, purge, sample and vent the different gasses or gas mixtures which flow in the individual conduits or gas sticks formed by coupling base blocks.

According to the present invention, a total of four different base blocks and two different manifold blocks can be assembled to provide a conduit breadboard to accommodate any ultra high purity (UHP) gas system schematic. Valves regulators, filters, pressure transducers, mass metering devices, etc., can be then be mounted at appropriate locations on the conduit matrix in order to form a completed gas panel.

FIGS. 3a–3d illustrate the four different base blocks, 310, 320, 330 and 340, used in the first embodiment of the present invention. A second embodiment of the present invention (discussed later) is essentially another set of four base blocks. Each base block includes an identical component interconnection face 360 to provide a universal mating surface for all functional components. That is, each base block 310, 320, 330 and 340, has a component interconnection face with identical placement of ports, sealing mechanism, and component and manifold mounting holes. Symmetrical porting on the component interconnection face provides a common mating face for all functional components being utilized in the system (except for conventional mass flow controllers (MFCs)). FIG. 4 shows a plurality of different functional components of the present invention. For the first embodiment of the present invention, each functional component includes an interface having an identical base interconnection face which aligns with and mates to the porting in the component interconnection face of the base blocks. In this way, each functional component, 410, 420, 430, 440 and 450 can be mounted on any base block 310, 320, 330 and 340 in the gas system.

Further, each base block 310, 320, 330 and 340 includes identical conduit interconnection face or faces in order to provide a universal mating surface for all conduit blocks. That is, each base block includes a conduit interconnection face or faces which have identical placement of ports, sealing mechanisms and throughholes for attaching base blocks together. Attachment of base blocks together about the conduit interconnection faces 370 and 372 produces a common conduit providing fluid communication among the various functional components which form a "gas stick". Additionally, the external interconnection faces of each base block are symmetrical so that the base block can be assembled bidirectionally.

Figure 3A:
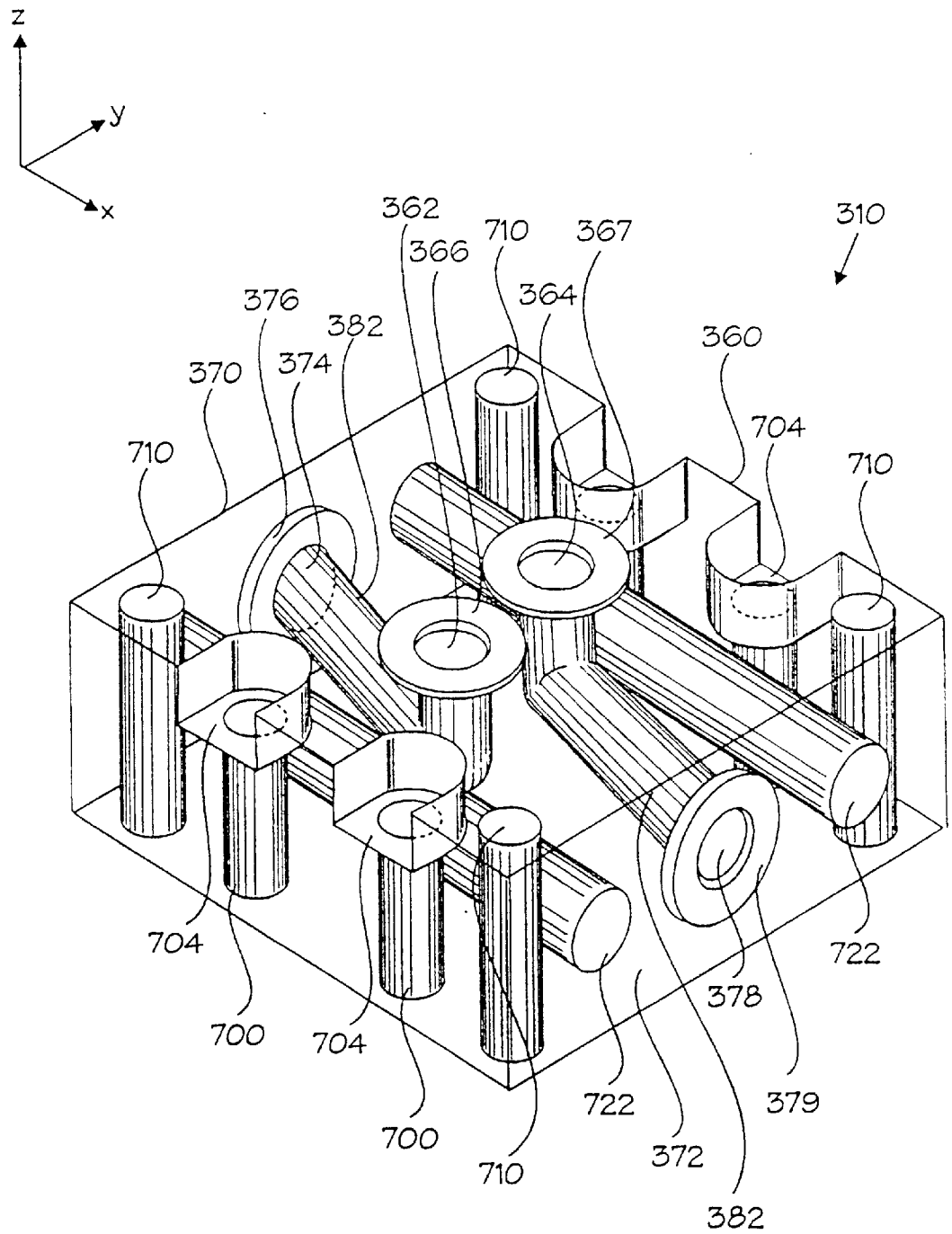
FIG. 3a is an illustration of a isolation base block for the first embodiment of the present invention.

Illustrated in FIG. 3a is an isolation base block 310 for the first embodiment of the present invention. Isolation base block 310 has a component interconnection face 360, which includes two ports or openings 362 and 364 formed therein. Surrounding each port 362 and 364 is a recess 366 and 367, respectively, used to form a seal between base block 310 and the functional component mounted thereon. Components ports 362 and 364 are placed symmetrically about the center of the interconnection face 360. Isolation base block 310 includes a first conduit interconnection face 370 adjacent to and perpendicular to component interconnection face 360, and a second conduit interconnection face 372 adjacent to and perpendicular to component interconnection face 360, and opposite conduit interconnection face 370. Formed symmetrically about the center of conduit interconnection face 370 is a conduit port 374 surrounded by a recess 376 used to form a seal between conduit interfaces of adjacent base blocks. Similarly, formed symmetrically about the center of interconnection face 372 is a conduit port 378 surrounded by a recess 379. Interconnection face 370 is identical to interconnection face 372. A first passage 380 formed in base block 310 provides fluid communication between component port 362 and conduit port 374. A second passage 382 formed in isolation base block 310 provides fluid communication between component port 364 and conduit port 378.

Isolation base block 310 can be used to provide isolation functions by connecting a valve to component interconnection face 360, and using the valve to either prevent or allow gas to flow between passages 380 and 382. Additionally, isolation base block 310 can be used for flow through functions, wherein a flow through device such as, but not limited to, a pressure regulator, a filter, or a pressure transducer is coupled to interconnection face 360 so that gas flows through passage 380 and into the flow-through device and out passage 382 (and visa-versa).

Figure 3B:
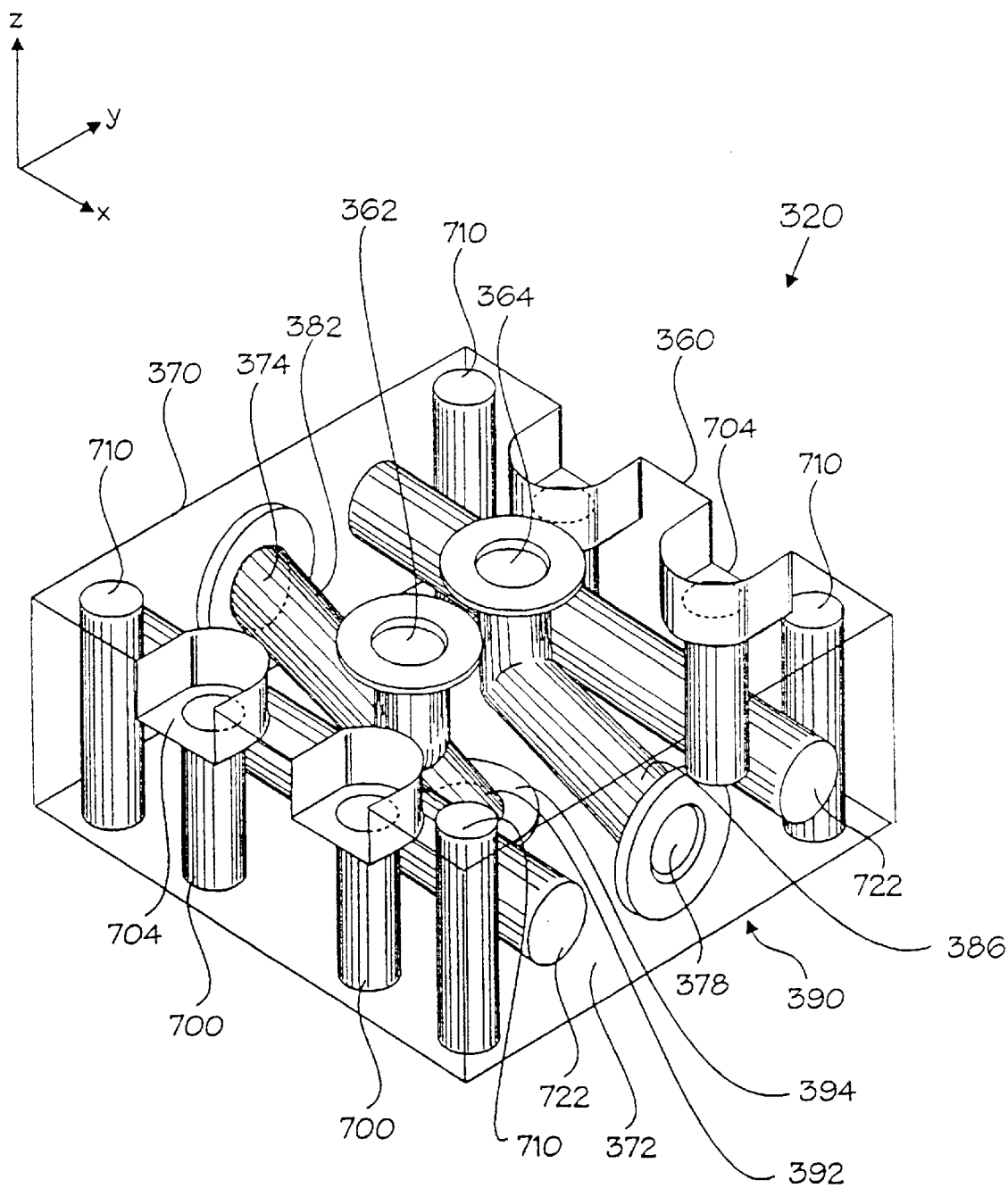
FIG. 3b is an illustration of an upstream/downstream control base block for the first embodiment of the present invention.

FIG. 3b illustrates the upstream/downstream control base block 320 (US/DS control) for the first embodiment of the present invention. US/DS control base block 320 has a functional component interconnection face 360 identical to component interconnection face 360 of isolation base block 310. Additionally, US/DS control base block 320 has a first conduit interconnection face 370 and a second conduit interconnection face 372 identical to conduit interconnection face 370 and 372 of isolation block 310. US/DS control block 320 also includes a manifold interconnection face 390, which is located on the opposite side of block 320 than interconnection face 360. Located symmetrically about the center of manifold interconnection face 390 is a manifold port 392 and a sealing recess 394. As shown in FIG. 3b, block 320 has a passage 382 which provides fluid communication between component ports 362, conduit port 374 and manifold port 392. A second passage 386 in US/DS control block 320 provides fluid communication between component port 364 and conduit port 378.

When a valve is attached to component interconnection face 360, US/DS control block can be used either to provide upstream control or downstream control. In order to provide downstream control, gas is fed into port 374. A downstream control can be used to direct purge gas from a purge gas stick into a purge gas manifold. Additionally, block 320 can be used to provide upstream control where gas is fed into block 320 through conduit port 378. Upstream control can be used, for example, to provide coupling of a mix manifold to a gas stick which contains the output block coupled to a reaction chamber. It is to be appreciated that US/DS block 320 is symmetrical and so can be rotated 180° about an axis (Z) formed through the center of interconnection face 360 and manifold interconnection face 390 in order to provide either upstream or downstream control at a specific position in the gas panel.

Figure 3C:
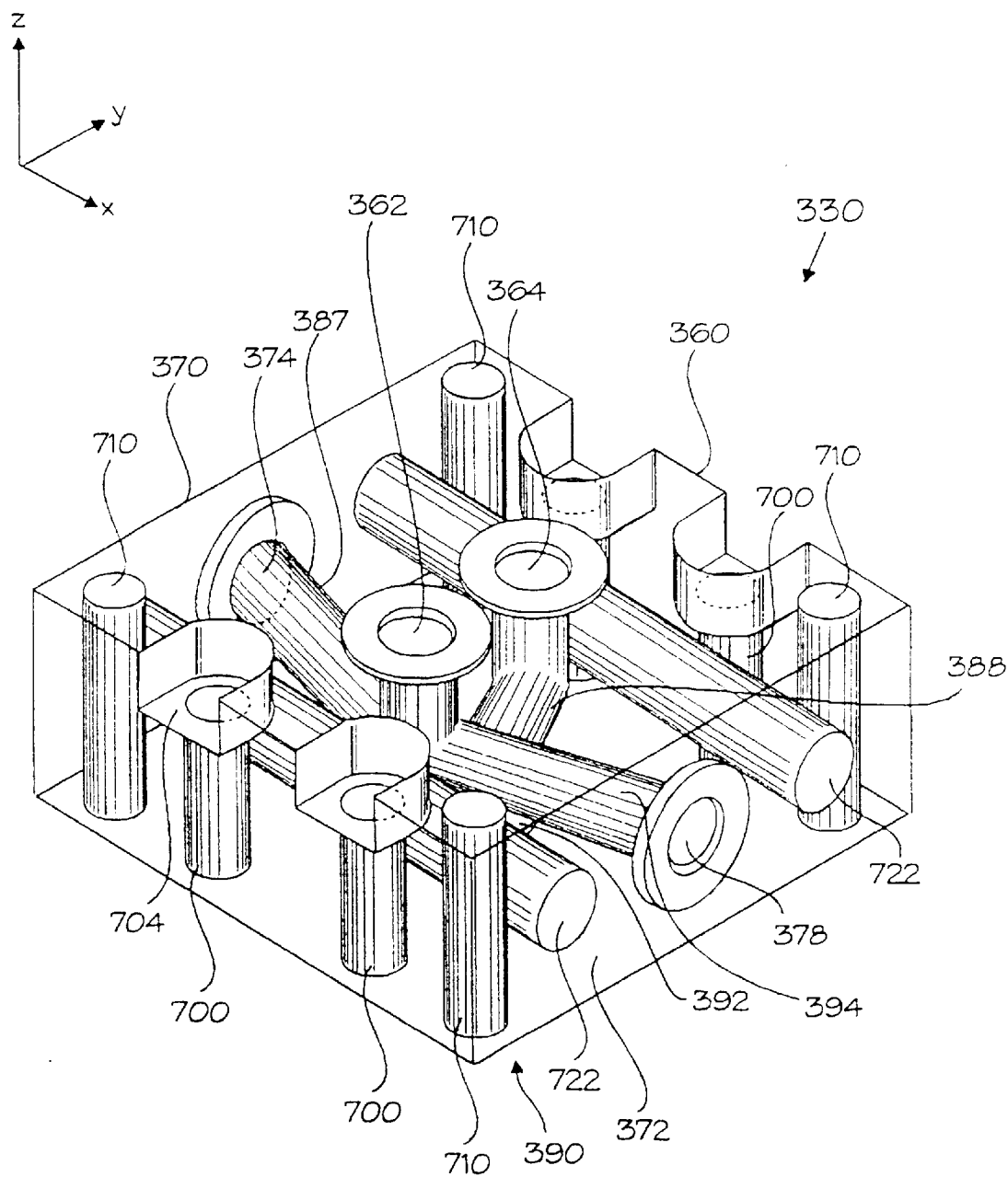
FIG. 3c is an illustration of a manifold control base block for the first embodiment of the present invention.

Shown in FIG. 3c is a manifold control base block 330 for the first embodiment of the present invention. Manifold control base block 330 includes a component interconnection face 360, identical to the component interconnection face of isolation block 310, and includes conduit interconnection faces 370 and 372 which are identical to conduit interconnection faces 370 and 372 of isolation block 310. Additionally, manifold control base block 330 includes a manifold interconnection face 390 identical to manifold interconnection of 390 of US/DS control block 320. Manifold control base block 330 includes a passage 387 which provides fluid communication between conduit port 374, component port 362, and conduit port 378. Additionally, manifold control base block 330 includes a second passage 388 which provides fluid communication between component port 364 and manifold port 392.

When a valve is coupled to component interconnection face 360 of manifold control block 330, manifold control block 330 can be used to couple a manifold passage to a gas stick. For example, manifold control block 330 can have manifold port 390 coupled to a purge manifold and be used to allow or prevent purge gas flow into components or passages coupled to conduit ports 374 and 378. Similarly, valve manifold control block 330 can be used to provide coupling to a sample or vent manifold passage coupled to manifold port 392.

Figure 3D:
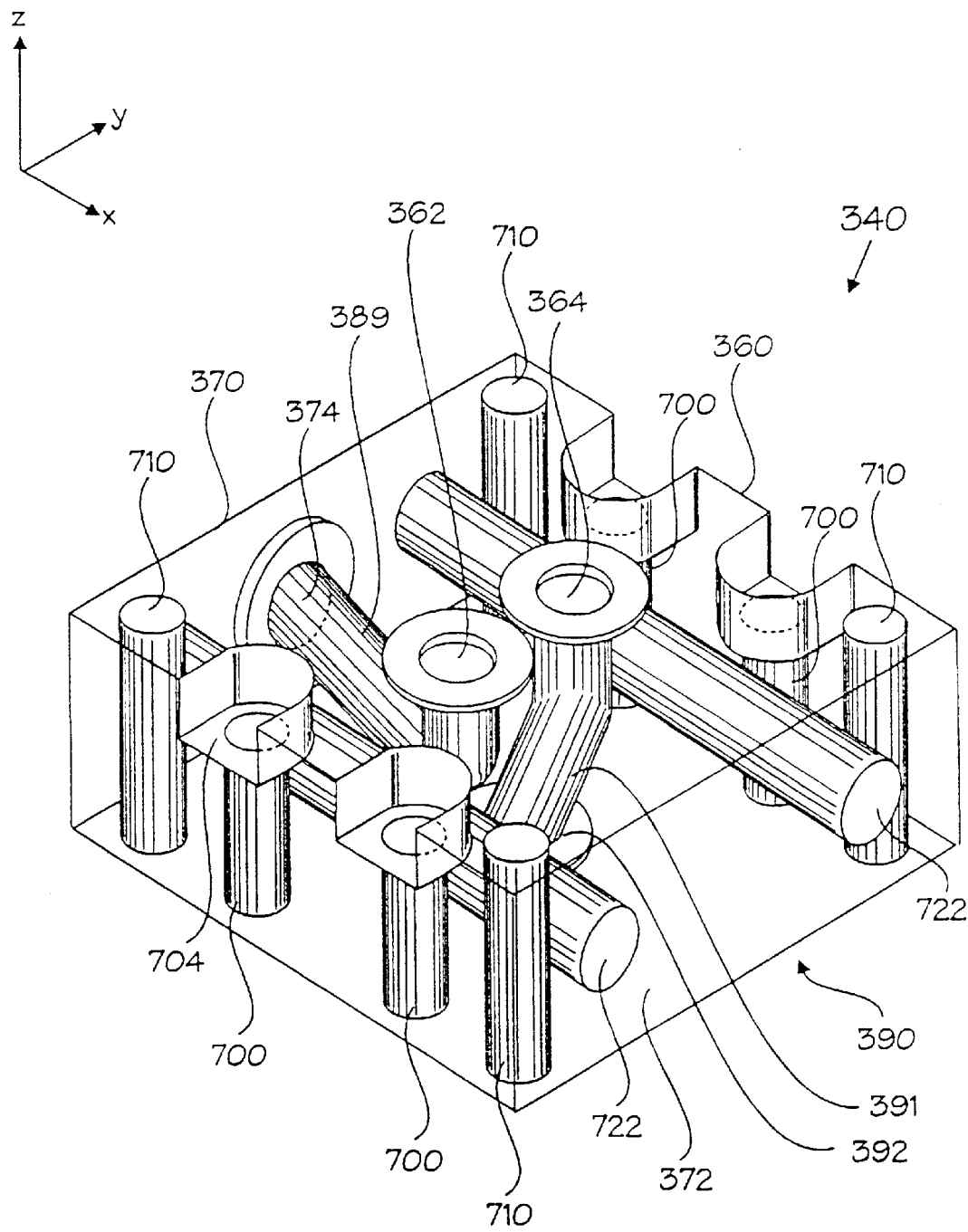
FIG. 3d is an illustration of a blind base block for the first embodiment of the present invention.

Shown in FIG. 3d is a blind base block 340 for the first embodiment of the present invention. Blind base block 340 includes a component interconnection face 360, which is identical to component interconnection face 360 of isolation block 310. Additionally, blind base block 340 includes a single conduit interconnection face 370 which is adjacent to and perpendicular to component interconnection face 360. Conduit interconnection face 370 is identical to conduit interconnection face 370 of isolation block 310. Blind base block 340 also includes a manifold interconnection face 390 which is opposite to and parallel with component interconnection face 360. Manifold interconnection face 390 is identical to manifold interconnection face 390 of US/DS control base block 320. Blind base block 340 has a passage 389 which provides fluid communication between conduit port 374 and component port 362, and a passage 391 which provides fluid communication between component port 364 and manifold port 392.

When a valve is connected to component interconnection face 360, blind base block 340 can be used as an end block in a gas stick to allow or prevent gas from entering into a manifold. It is to be noted that filter, regulators, or pressure transducers can be attached to the component interconnection face 360 of base blocks 320, 330 and 340 in order to regulate or filter gases as they flow into or out of a manifold.

It is to be appreciated that the symmetries of conduit interconnection faces 370 and 372, manifold interconnection face 390, as well as component interconnection face 360 of the base blocks 310, 320, 330 and 340 allow for the 180° rotation of any base block to accomplish desirable variation in gas routing and controls. On base blocks 320, 330 and 340 the ports 362 and 364, the functional component mounting bolt holes 710 and the manifold downmounting holes 704 on surfaces 360 are reflection symmetric about each of the two lines bisecting opposite edges of face 360. Furthermore, the conduit interconnection faces 370 and 372 are reflection symmetric about a line which bisects and is perpendicular to the edge common to faces 360 and 370 or 360 and 372, respectively.

FIGS. 3f–3i show four different base blocks, 311, 321, 331 and 341, for a second embodiment of the present invention. The second embodiment is substantially similar to the first embodiment with two major exceptions. First, only three of the four base blocks 311, 321 and 341, include an identical component interconnection face 361. Second, for base blocks 311, 321 and 341, the components ports 362 and 364 are not symmetrically placed upon the component interconnection face 361; but rather, one port is centered upon component interconnection face 361 and the other port is near the conduit interconnection face 372. The second embodiment, like the first, has the capability of assembling any of the base blocks bidirectionally. That is, each base block may be placed in either direction along the gas stick.

Figure 3E:
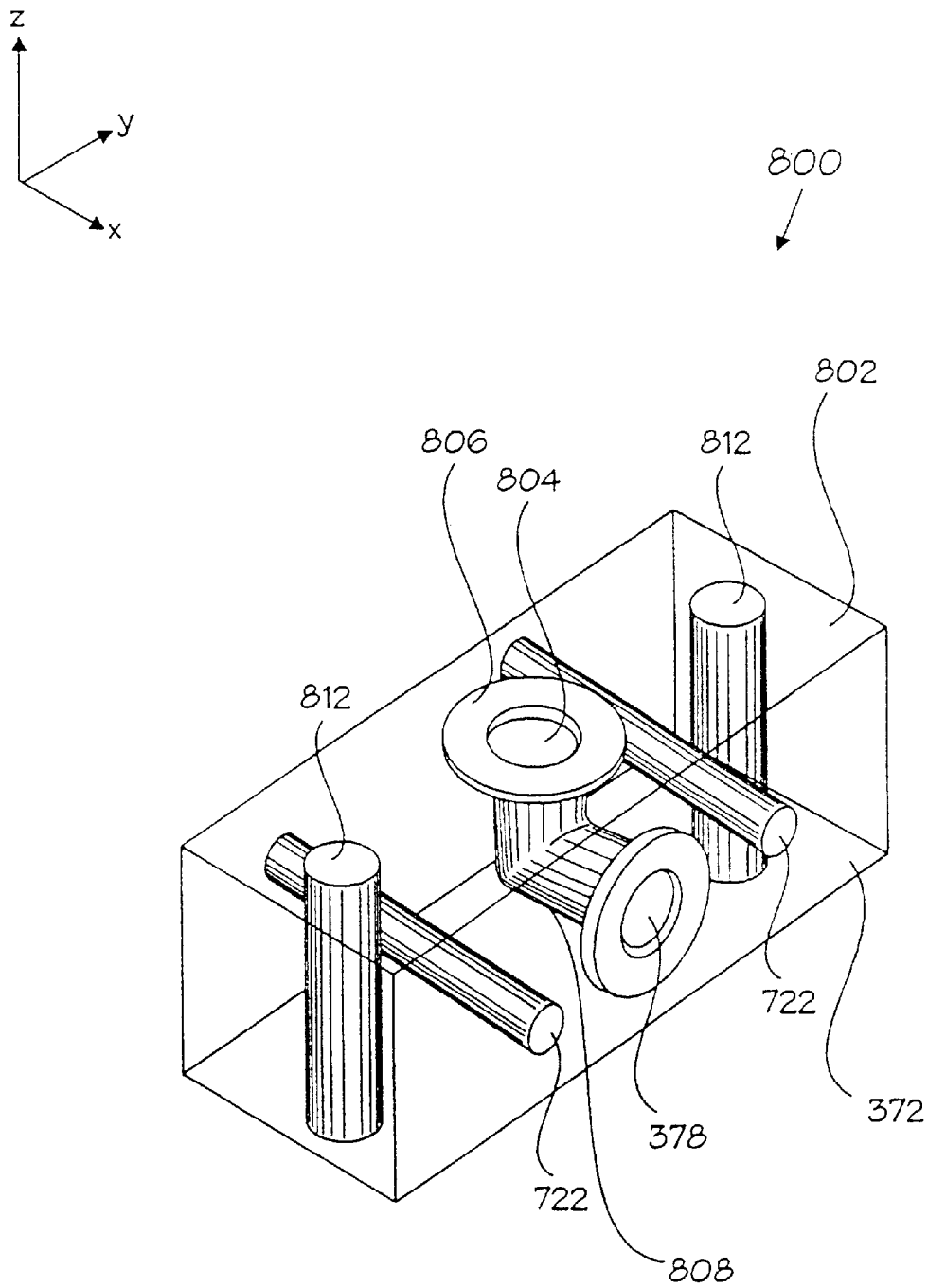
FIG. 3e is an illustration of a bridge base block of the present invention.

The component interconnection face 312 of base block 331 has three components ports 332, 333 and 334. Thus, unlike the first embodiment, the second embodiment does not provide a universal mating surface for all functional components. Also note that base block 331 has different passage structures than base block 330 (shown back in FIG. 3c). That is, base block 331 has passages 306, 307, 308 while base block 300 has passages 387 and 388. As shown in FIG. 3h, base block 331 has a first passage 306 that provides fluid communication between conduit port 374 and component port 332. Additionally there is a second passage 307 that provides fluid communication between manifold port 392 and component port 333. A final third passage 308 provides fluid communication between conduit port 378 and component port 334.

Base block 331 is analogous to base block 330 in the sense that base block 331 is a manifold control block. That is, base block 331 is used for controlling the coupling of a manifold fluid communication line to a fluid communication stick. This requires both: 1) fluid communication between conduit port 374, conduit port 378 and the functional component and 2) fluid communication between the functional component and the manifold port 392. However, unlike base block 330, base block 331 does not provide fluid communication between the conduit ports 374 and 378 within the base block 331 itself. Under the second embodiment, this communication is provided by the functional component. A schematic depiction of the functional component for use with base block 331 is shown in FIG. 3j. Within the functional component 313 there is fluid communication 316 between component ports 332 and 334 of base block 331. This provides fluid communication between conduit ports 374 and 378. The coupling of the manifold fluid communication line to the base block fluid communication stick is controlled by diaphragm valve 335 which controls fluid flow through component port 333. Component port 333 is in fluid communication with manifold port 392. Another embodiment of this technology, shown in FIG. 3k, incorporates a diaphragm valve 302 into a recessed cavity 303 of the base block 305. Basically, structures shown in FIG. 3j as part of functional component 313 are simply incorporated into base block 331. The functional component 301 is simply a housing 304 that controls the movement of the diaphragm valve 302.

Although base block 330 is a two port base block (and therefore preserves the universal mating surface for all functional components), base block 331 has its own important advantages compared to base block 330. Referring back to FIG. 3c, base block 330 requires the drilling of passages 387 and 388 at angles with faces 370, 372 and 390. Angle drilling is less desirable because it leaves oval shaped openings in the base block 330 and is difficult to set up (thereby increasing manufacturing costs).

As previously mentioned, base blocks 311, 321 and 341 are substantially similar to base blocks 310, 320 and 340 of the first embodiment. However, a few differences exist. For base blocks 311, 321 and 341, the components ports 362 and 364 are not symmetrically placed upon the component interconnection face 361. This results in various new channel passage shapes 381, 383, 384, 385, 395 and 396 when each second embodiment base block 311, 321 and 341 is compared to its first embodiment counterpart 310, 320 and 340 respectively.

Figure 3F:
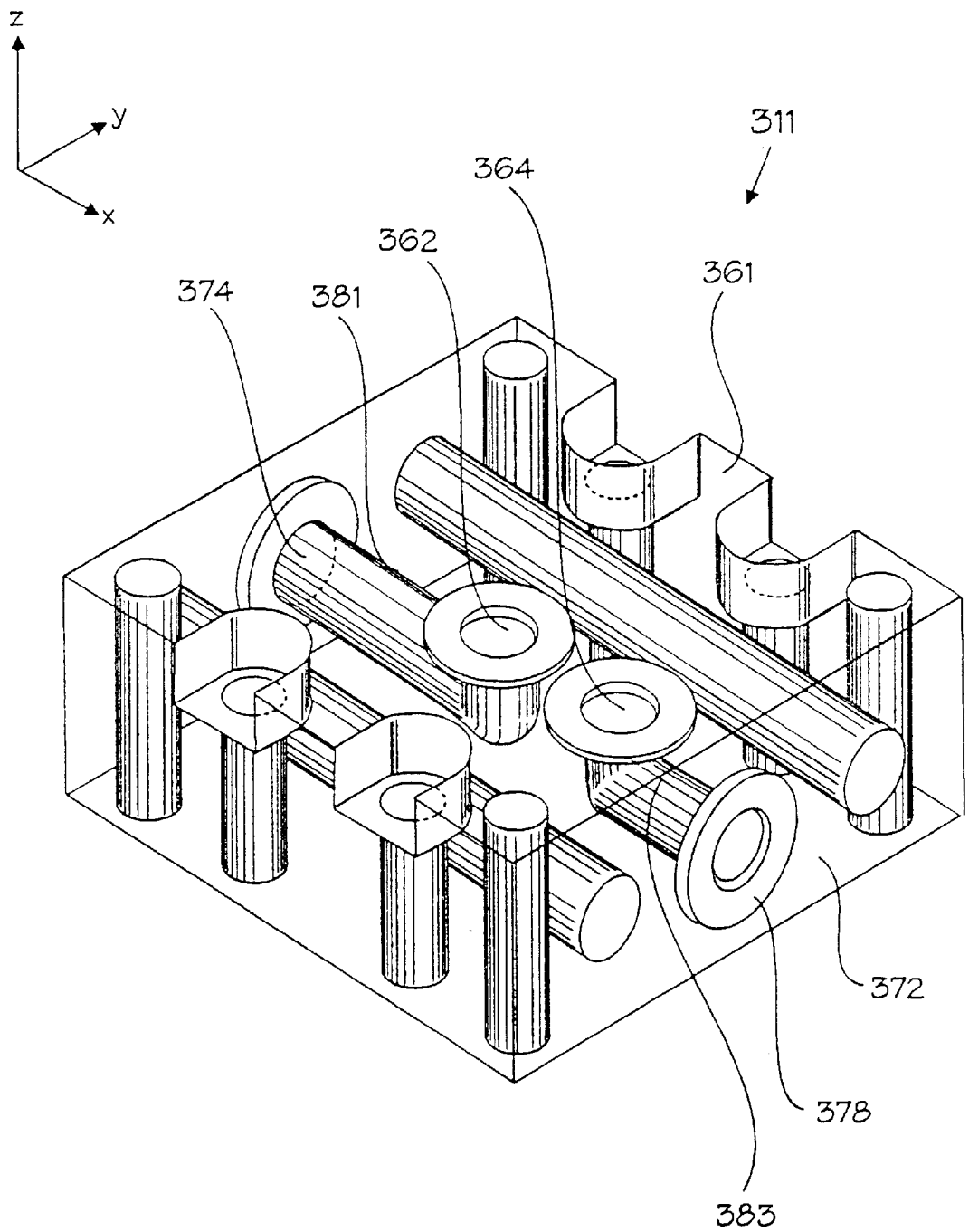
FIG. 3f is an illustration of an isolation base block for the second embodiment of the present invention.

Specifically, block 311, shown in FIG. 3f, has a passage 381 which provides fluid communication between component port 362 and conduit port 374. A second passage 383 provides fluid communication between component port 364 and conduit port 378.

Figure 3G:
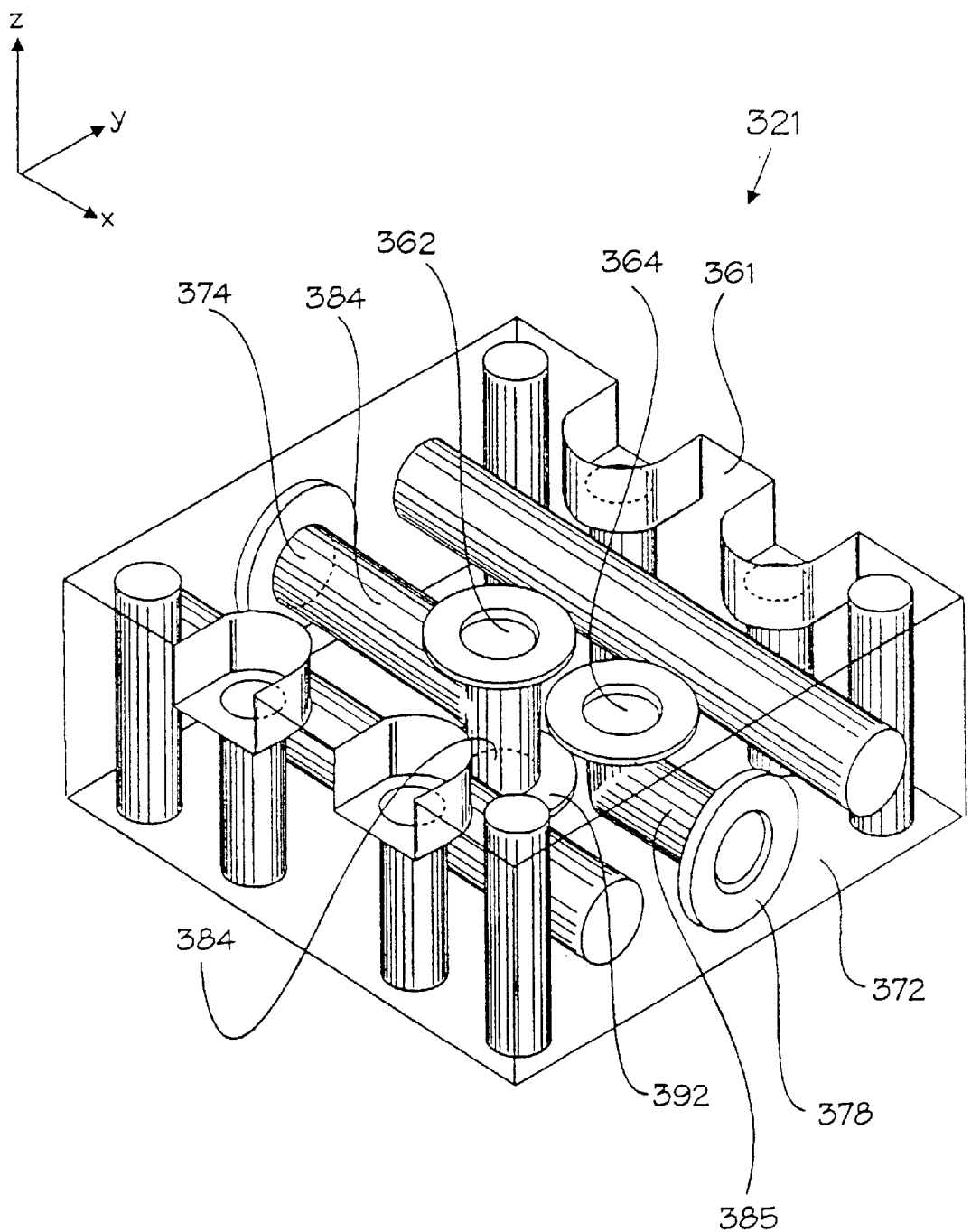
FIG. 3g is an illustration of an upstream/downstream control base block for the second embodiment of the present invention.
Figure 3H:
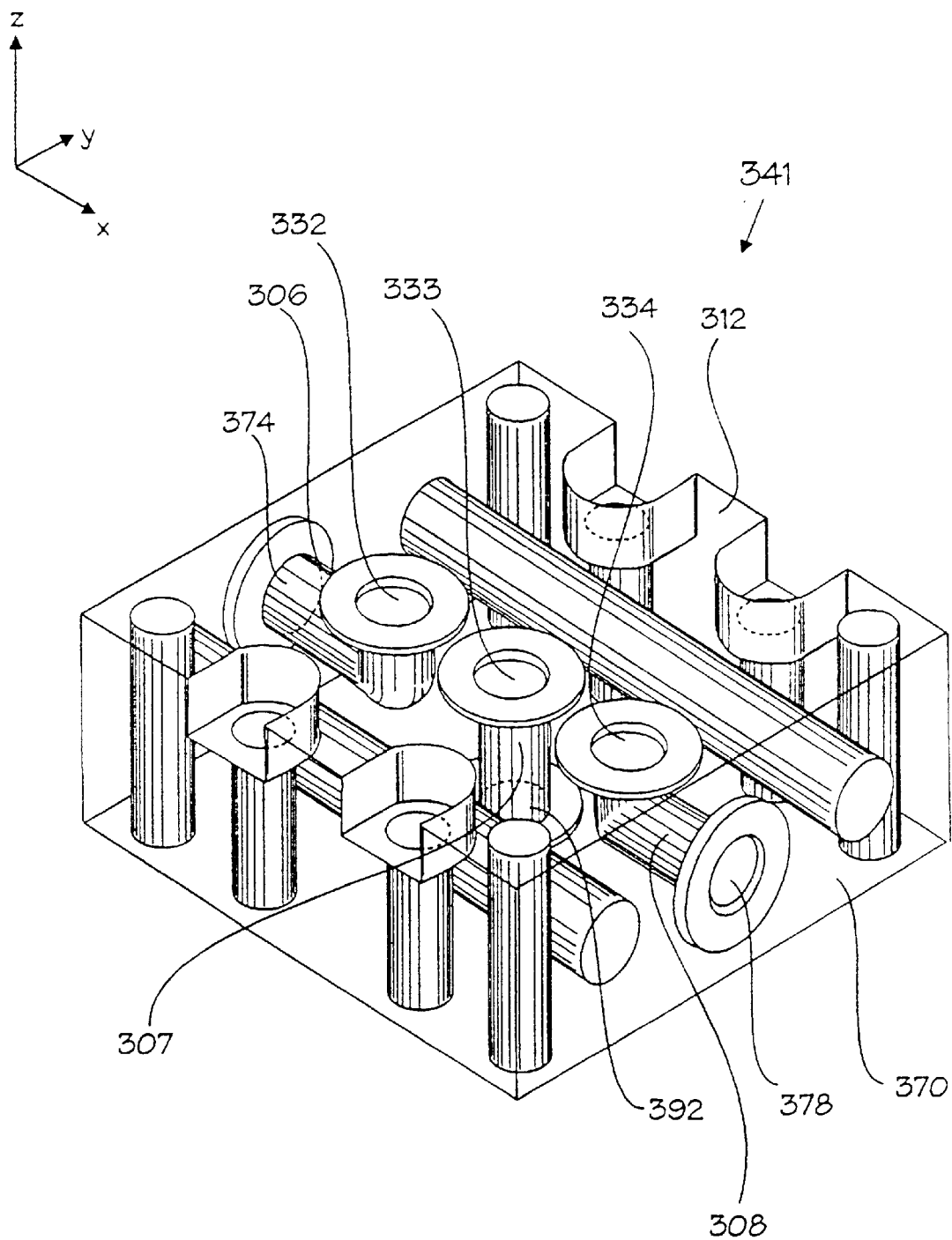
FIG. 3h is an illustration of a manifold control base block for the second embodiment of the present invention.

Block 321, shown in FIG. 3g, has a passage 384 which provides fluid communication between component port 362, conduit prot 374 and manifold port 392. A second passage 385 provides fluid communication between component port 364 and conduit port 378.

Figure 3I:
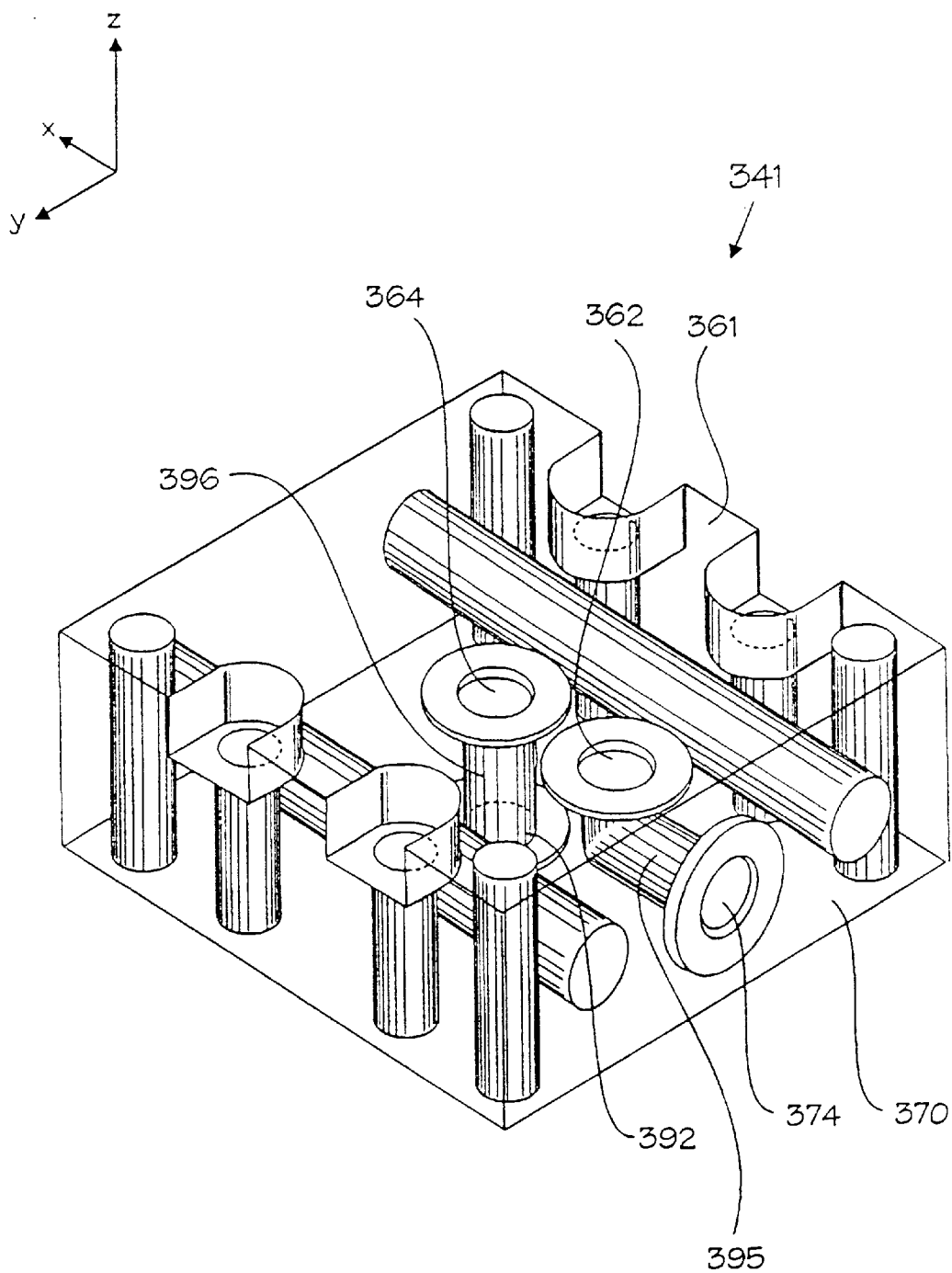
FIG. 3i is an illustration of a blind base block for the second embodiment of the present invention.
Figure 3J:
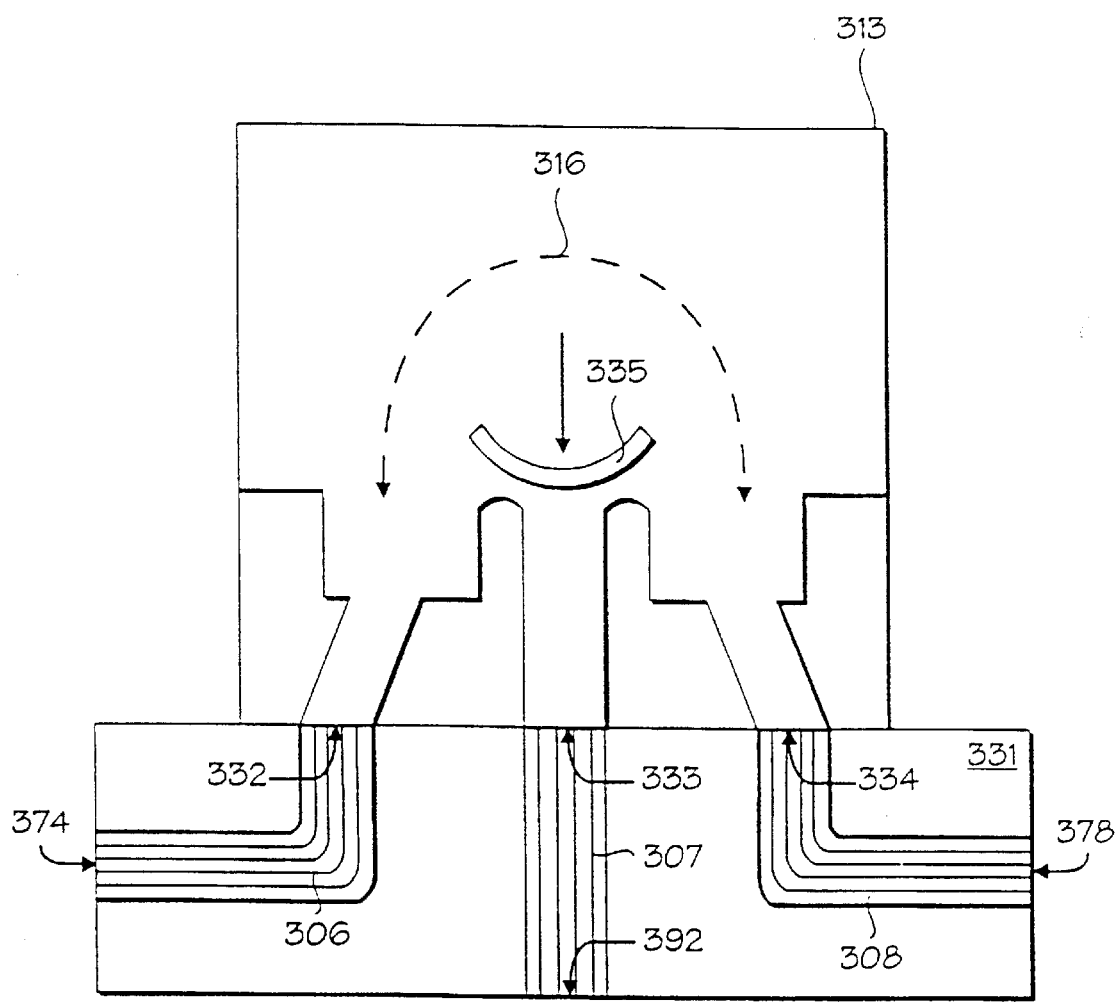
FIG. 3j is an illustration of a first manifold control base block for the second embodiment of the present invention coupled to a functional component.
Figure 3K:
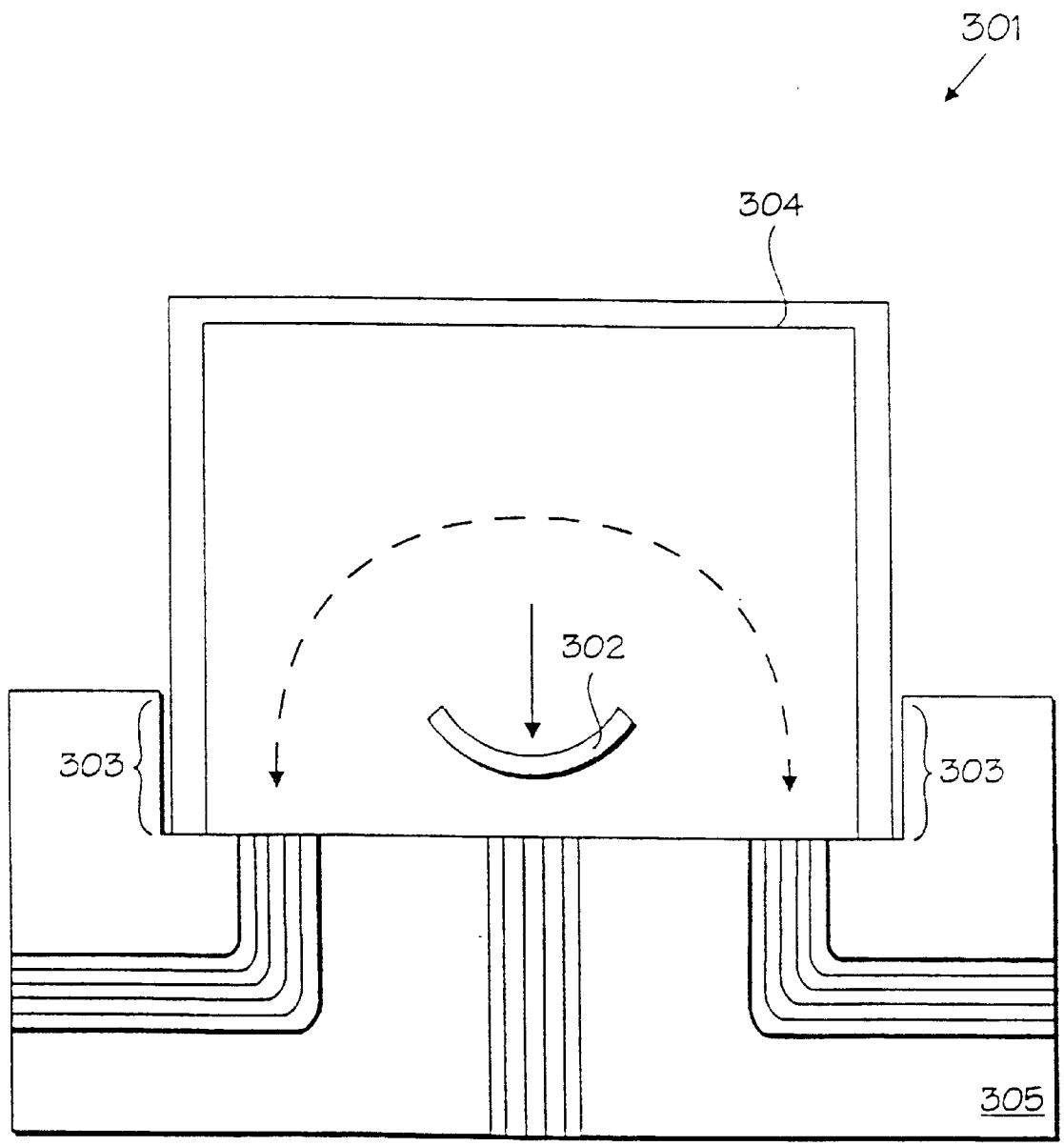
FIG. 3k is an illustration of a second manifold control base block for the second embodiment of the present invention coupled to a functional component.

Block 341, shown in FIG. 3i, has a passage 395 which provides fluid communication between conduit port 374 and component port 362, and a passage 396 which provides fluid communication between component port 364 and manifold port 392.

Note that the above descriptions for second embodiment passages 381, 383, 384, 385, 395 and 396 are identical to the descriptions for their first embodiment counterpart passages. That is, the difference between each first embodiment and second embodiment counterpart passage is limited to the shape of the passage not its function. Again, this is due to the fact that the main difference between the first embodiment and the second embodiment, at least for base blocks 310/311, 320/321 and 340/341 is simply the location of component ports 362 and 364.

The asymmetrical placement of component ports 362 and 364 allows for compatibility between base blocks 311, 321 and 341 and existing product offerings from various integrated gas system functional components suppliers. Base blocks 311 and 321 are configured with functional component port 362 centered on the component interconnection face 361 and functional component port 364 centered 0.315 inches from the center of functional component port 362 along the x axis. Base block 341 is configured such that functional component port 364 is centered on the component interconnection face 361 and functional component port 362 is centered 0.315 inches from the center of functional component 364 along the x axis. There exists no practical significance in the difference between the component port numbering schemes for block 341 and blocks 311, 321. The difference exists merely to preserve the identical language used to describe the function and passage structure of base blocks 340 and 341.

Thus there are two sets of four base blocks (310/20/30/40 and 311/21/31/41) representing two different embodiments of the present invention. The rest of this application discusses the remainder of the present invention. That is, the components described ahead are capable of working with either the first embodiment base block set or the second embodiment base block set. For simplicity, the remainder of the application mostly refers only to the first embodiment set of base blocks. However, it is to be appreciated that in the remainder of this application base blocks 311, 321, 331 and 341 may be read interchangably wherever base blocks 310, 320, 330 and/or 340 are mentioned, respectively.

Figure 5A:
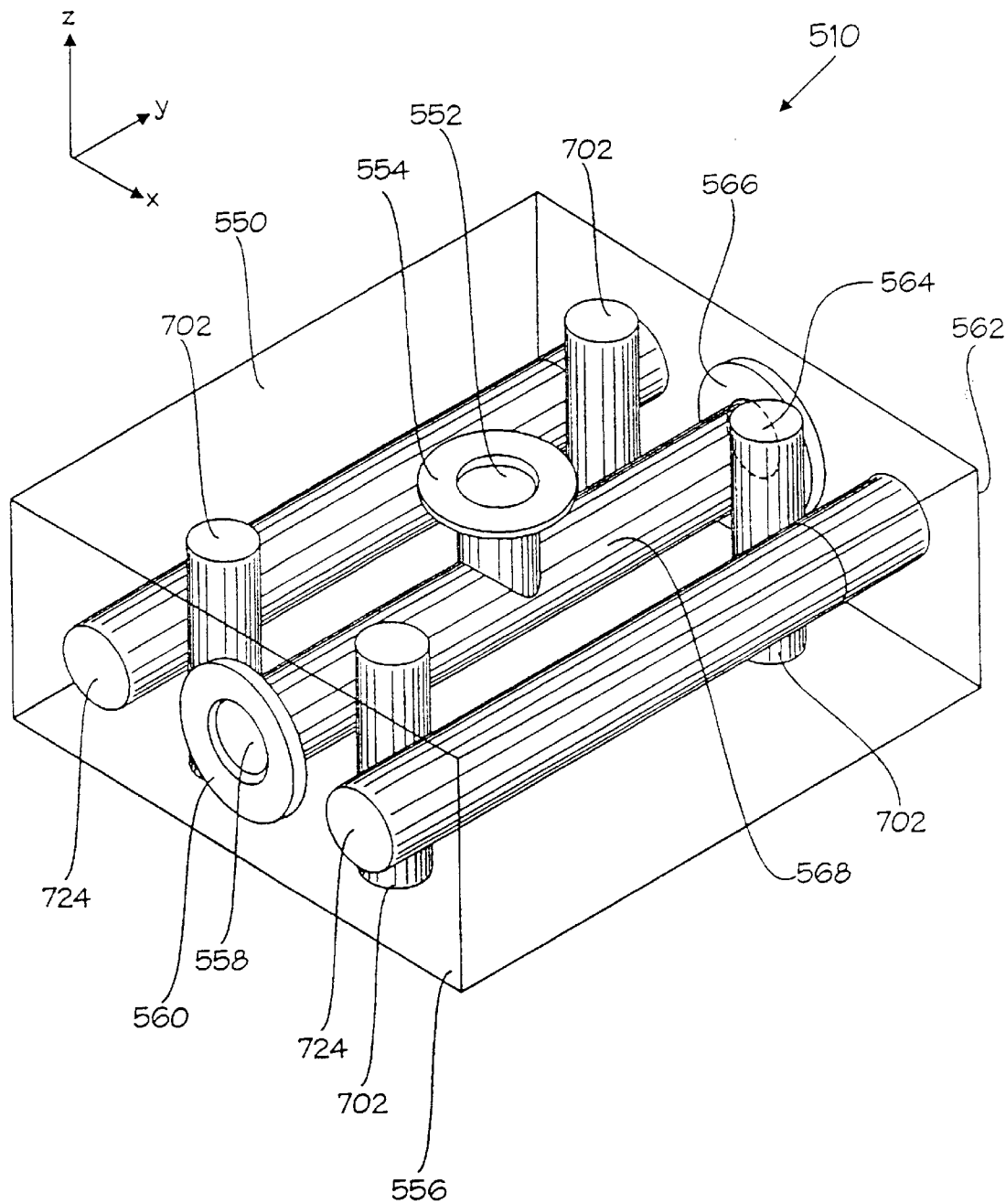
FIG. 5a is an illustration of a flow-through manifold block of the present invention.
Figure 5B:
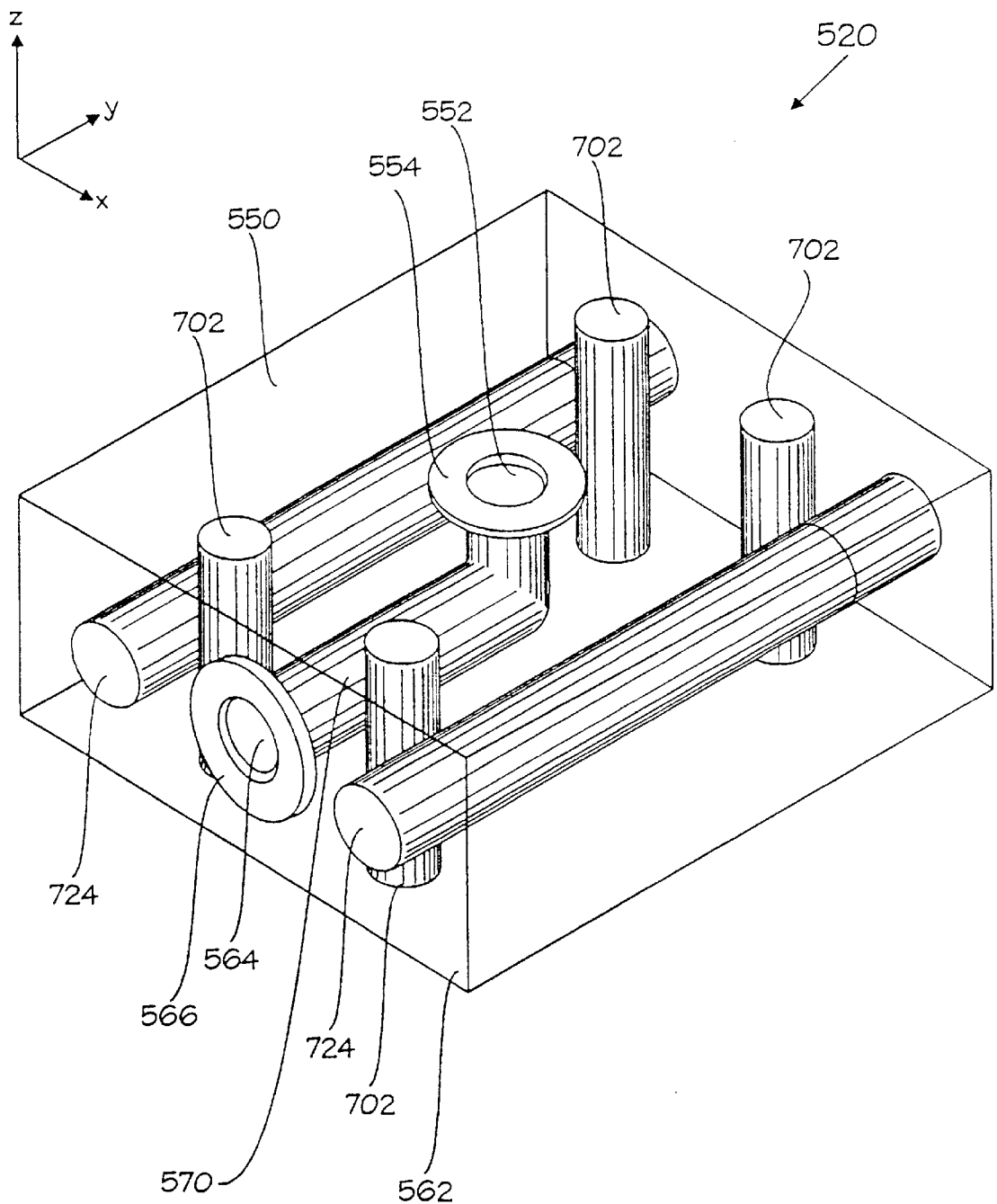
FIG. 5b is an illustration an elbow manifold block of the present invention.

The two manifold blocks of the present invention are shown in FIGS. 5a and 5b. The manifold blocks align to and mate with manifold interconnection faces 390 of base blocks 320, 330 and 340 to provide gas communication between individual gas sticks or conduits.

FIG. 5a shows a flow-through manifold block 510. Flow-through manifold block 510 includes a base interconnection face 550 which mates with and aligns to manifold interconnection face 390 of base blocks 310, 320, 330 and 340. A base port 552 is formed symmetrically about the center of base interconnection face 550. A recess 554 for sealing is formed symmetrically about base port 552. Flow-through manifold 510 includes a manifold interconnection face 556 adjacent to and perpendicular to base interconnection face 550. Manifold interconnection face 556 has a manifold port 558 positioned symmetrically about the center of manifold interconnection face 556. A recess 560 for sealing purposes is formed symmetrically about manifold port 558. Flow-through manifold 510 also includes a second manifold interconnection face 562 which is parallel to and opposite manifold interconnection face 556. A manifold port 564 is formed symmetrically about the center of manifold interconnection face 562. A recess 566 is formed symmetrically about manifold port 564. Manifold interconnection face 562 is identical to manifold interconnection face 556. A single passage 568 provides fluid communication between manifold port 558, base port 552 and manifold port 564.

FIG. 5b shows an elbow manifold block 520 of the present invention. Elbow manifold block 520 includes a base interconnection face 550 which is identical to base interconnection face 550 of flow-through manifold block 510. Additionally, elbow manifold block 520 includes a manifold interconnection face 562 which is adjacent to and perpendicular to base interconnection face 550. Manifold interconnection face 562 of elbow manifold block 520 is identical to manifold interconnection face 562 of flow-through manifold 510. A single passage 570 provides fluid communication between base port 552 and conduit port 564.

The manifold blocks depicted in FIGS. 5a and 5b are the minimum blocks necessary to construct a functional gas panel. However, for ease of use in application, additional manifold blocks may be added to the basic two manifold block set (the flow through manifold block 510 and the elbow manifold block 520). These additional or optional manifold blocks are basically often repeated groupings of the two basic manifold blocks incorporated into a single larger base block.

Figure 5C:
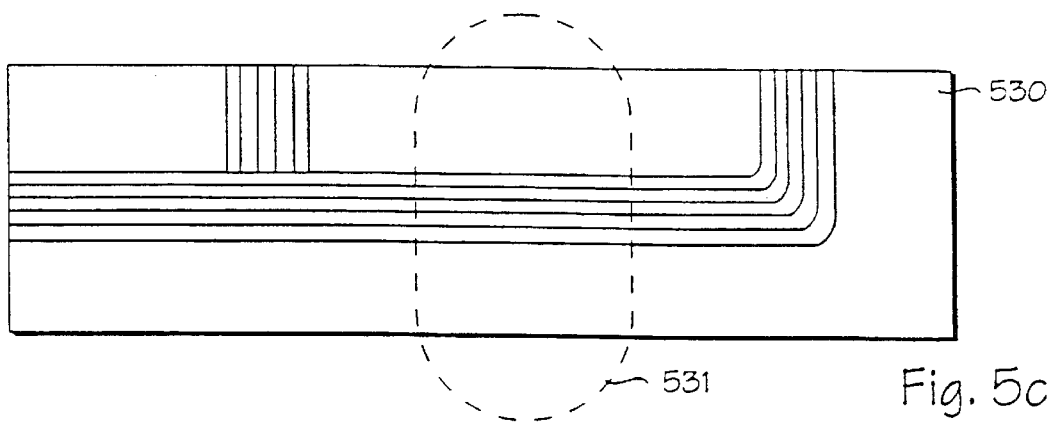
FIG. 5c is an illustration of a first optional manifold control block.
Figure 5D:
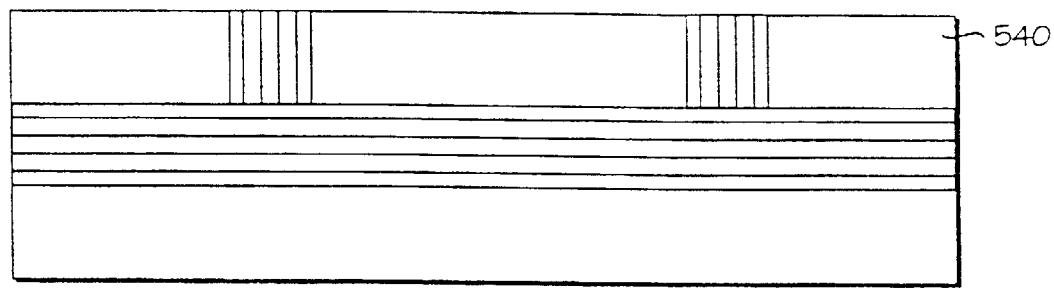
FIG. 5d is an illustration of a second optional manifold control block.
Figure 5E:
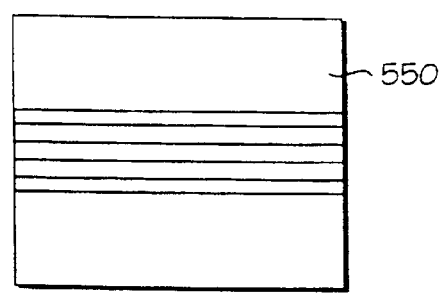
FIG. 5e is an illustration of a third optional manifold control block.

Schematic representations of three optional manifold blocks are shown in FIGS. 5c, 5d and 5e. FIG. 5c shows what is essentially a coupled flow through manifold block 510 and elbow manifold block 520 incorporated into a single manifold block 530. Single manifold block 530 is a single, solid block and therefore does not have any port interface structure within its midsection 531. Similarly, the manifold block 540 of FIG. 5d is two coupled flow through manifold blocks 520. The manifold blocks 530, 540 of both FIGS. 5c and 5d are twice as long as the manifold blocks 510, 520 of FIGS. 5a and 5b. Finally, FIG. 5e shows a final optional manifold block 550 that provides a simple straight through function.

It is to be appreciated that each manifold block includes identical manifold interconnection faces in order to provide a universal mating surface for attaching manifold blocks together. That is, each manifold block includes a manifold interconnection face which has identical placement of ports, sealing mechanisms, and throughholes for attaching manifold blocks together. Additionally, each manifold block has identical base block interconnection faces in order to provide a universal mating surface for attaching manifold blocks to base blocks. That is, each manifold includes a manifold interconnection face with identical placement of ports, sealing mechanisms, and throughholes for attachment to base blocks.

An important aspect of the first embodiment base blocks is the fact that the components attached to the component interconnection face of these base blocks have identical base interconnection faces. That is, each functional component has an identical footprint (i.e., has an interconnection face with identical placement of ports, sealing mechanisms, and component mounting holes). For the second set of base blocks, the functional components that attach to base blocks 311, 321 and 341 have an identical footprint. Thus, except for the manifold control base block 331 of the second embodiment, the functional components associated with a specific embodiment may be coupled to any base block.

In order to provide a common footprint for each functional component, each functional component has a transition interface which includes an identical base block interconnection face 460 with identical placement of ports 462 and 464, sealing recesses, and base block mounting through holes 712. Interconnection face 460 is preferably substantially planar. The transition interface provide only simple input and output passages to transform the specific input and output configuration of the functional component to the port placement of base block interconnection face 460.

FIG. 4 illustrates functional components of the present invention which can be utilized in a gas panel of present invention. For example, FIG. 4 shows a well known pneumatic diaphragm valve 410 mounted into a transition interface 412 having a base block interconnection face 460, a well known manual diaphragm valve 420 mounted into a transition interface 422 with a base block interconnection face 460, a well known gas regulator 430 mounted into a transition interface 432 having a base block interconnection face 460, a well known filter 440 mounted into a transition interface 442 having a base block interconnection face 460, and a well known pressure transducer 450 having a transition interface 452 with a base block interconnection face 460. Two different sets of transition interfaces 412, 422, 432, 442 and 452 will obviously exist. The set employed depends upon which base block embodiment is selected.

It is to be stressed that the functional components of the present invention, including their transition interfaces, contain no functional routing such as branches or transverse passages. They contain only simple input and output ports which input and output gas to the internal workings of the component. That is, while gas porting or routing is intrinsic to any functional component for its own functionality, functional components in the present invention are not used or relied upon to form the basic gas conduits, either stick conduits or transverse manifolds. The basic conduits of the present invention are formed by the base blocks and manifold blocks.

According to the present invention, base blocks are down mounted onto manifold blocks and functional components are down mounted onto base blocks. Each base block 310, 320, 330 and 340 includes four bolt throughholes 700 formed about the perimeter of the base block and which align with threaded screw holes 702 formed in manifold blocks 510 and 520. When screws are placed through screw holes 700 and 702, base port 552 of manifold blocks align with manifold port 392 of the base blocks. Counter bores or clearance holes 704 are formed in the base blocks to allow the recessing of screw heads beneath component interconnection face 360. Additionally, provided in each corner of each base block is a component mounting screw hole 710. Additionally, formed within each interconnection face 460 of each functional component are a plurality of holes 712 which align to component mounting screw holes 710 formed in the base blocks. When screws are placed through holes 712 and into corresponding component mounting screw holes 710, component ports 364 and 362 in the base blocks align with base ports 464 and 462 in the component interface.

Individual base blocks of a gas stick are attached together by bolting. Each base block 310, 320, 330 and 340 includes two throughholes 722 which extend through each opposing interconnection face. When a bolt is placed through each throughhole 722 conduit ports align with conduit ports of adjacent base blocks. Similarly, two throughholes 724 are formed through each of the manifold blocks 510 and 520 allow bolting of manifold blocks to one another to form a common manifold or passage. When bolts are placed through throughholes 724, manifold ports of adjacent manifold blocks align. It is to be appreciated that the manifold blocks are bolted together transverse to the bolting of the base blocks.

Manifold blocks can be mounted to a plane according to the description provided in U.S. patent application Ser. No. 08/893,773 entitled Mounting Plane For Integrated Gas Panel filed on Jul. 11, 1997 and assigned to the present assignee.

Base blocks and manifold blocks of the present invention are preferably each a single solid stainless steel six-sided block. The base blocks have 0.188 inch drilled passages for gas routing and the manifold blocks have 0.25 inch drilled passages for gas routing. For high flow situations it may be desirable to provide the base blocks with 0.25 inch passages. All wetted surfaces or gas exposed surfaces are electropolished to prevent corrosion and to provide an ultra clean environment through the reduction of surface area and attendant gas adsorption. Additionally, all interconnection faces of the blocks are substantially planar and are machined to obtain a surface flatness of between 0.001–0.003 inches. The planar surfaces are machined or embossed to provide a uniform surface finish of 64 RA or greater (rougher) to increase the coefficient of friction, and therefore the total frictional forces of the planar surfaces, when bolted or compressed together, to provide mechanical integrity of assembly. It is to be appreciated that for illustration purposes, blocks of the present invention have been illustrated inversely wherein drilled holes and passages are shown as dark solid features and wherein solid block features are shown clear.

In the preferred embodiment of the present invention base blocks 310, 320, 330 and 340 each have a 1.5×1.5 inch component interconnection face 360 (X×Y) and a 0.6×1.5 inch (Z×Y) conduit interconnection face 372 and 370. Component mounting holes 710 are 0.164 inch diameter threaded holes with their centers located at the corners of a 1.23×1.23 inch square positioned about the center of interconnection face 360. Additionally, manifold throughholes 700 are also 0.164 inches in diameter and are located at the corners of a 1.230×0.533 inch rectangle (Y×X) positioned about the center of interconnection face 360. Finally, throughholes 722 shown in FIGS. 3a–3e are 0.203 inches in diameter and are positioned 0.851 inches apart on the horizontal center line of the conduit interconnection faces 372 and 374.

In the preferred embodiment of the present invention, manifold blocks 510 and 520 each have a 1.440×1.70 (X×Y) base block interconnection face 550 and a 1.44×0.60 (X×Z) manifold interconnection face 562 and 556. Threaded holes 702 are 0.164 inches in diameter and are positioned symmetrically at the corners of 0.533×1.23 (X×Y) inch rectangle positioned symmetrically about base block interconnection face 550. Additionally, throughholes 724 are positioned, symmetrically as shown in FIGS. 5a and 5b, 1.0 inch apart on the horizontal center line of manifold interconnection faces 556 and 562.

Figure 7:
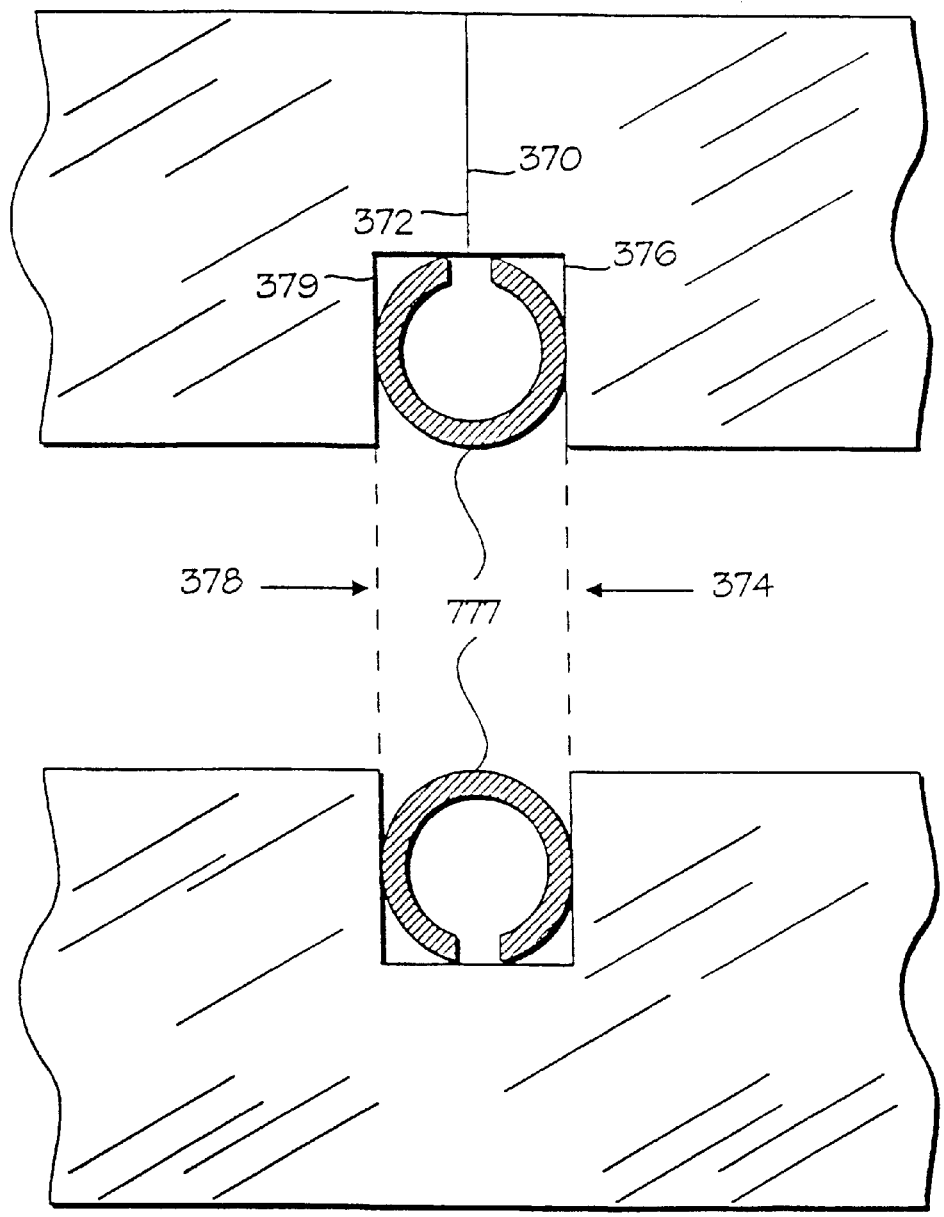
FIG. 7 is a cross-sectional illustration of a "C"-seal metal compression seal.

According to the present invention, the sealing of ports between components and base blocks, adjacent base blocks, base blocks and manifold blocks, and adjacent manifold blocks may be implemented utilizing well known "C"-seal metal compression seals. FIG. 7 illustrates a well known metal "C"-seal formed between conduit interconnection faces 370 and 372 of two base blocks. In such a case, a circular compliant metal gasket 777 of, for example, stainless steel or nickel, is placed within the recesses 376 and 379 formed about each port 374 and 378. The gasket 777 is then compressed within the recesses and around the adjoining ports to form a vacuum and pressure tight seal when the joining blocks are bolted or screwed together. With such a compression seal, the sealing mechanism is integral to each block. The compression seals of the present invention do not require an extension or welded interface. Additionally, it may be desirable to include a ridge or protrusion (such as a "knife edge") surrounding each port and within each recess so that the blocks are embedded into the gasket to further increase the integrity of the seal.

A metal compression "C"-seal is one method of sealing adjacent ports together. Other suitable and reliable all metal sealing techniques may be utilized such as knife edge seals, VCR type seals, or similar seals which enjoy a disposable compliant metal element compressed between sealing surfaces to effect an all metal seal capable of $1 \times 10^{-10}$ sccs helium leak tight operation from vacuum to 3000 psi operating gas pressure.

Figure 8A:
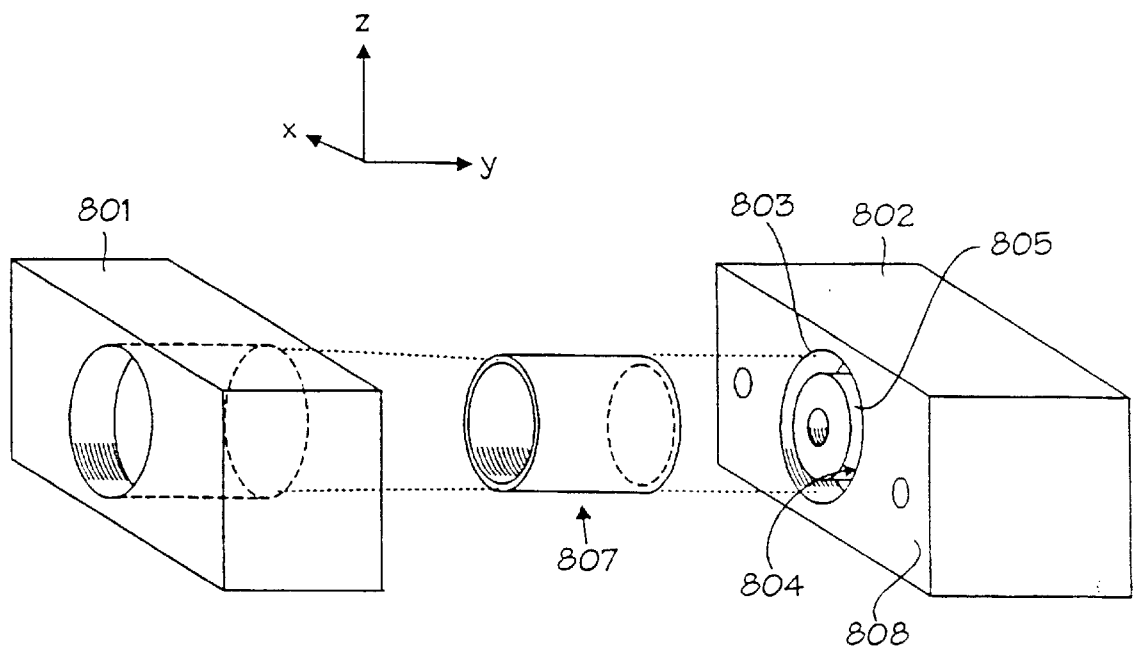
FIG. 8a is an illustration in three dimensions of a sealing port according to the present invention.
Figure 8B:
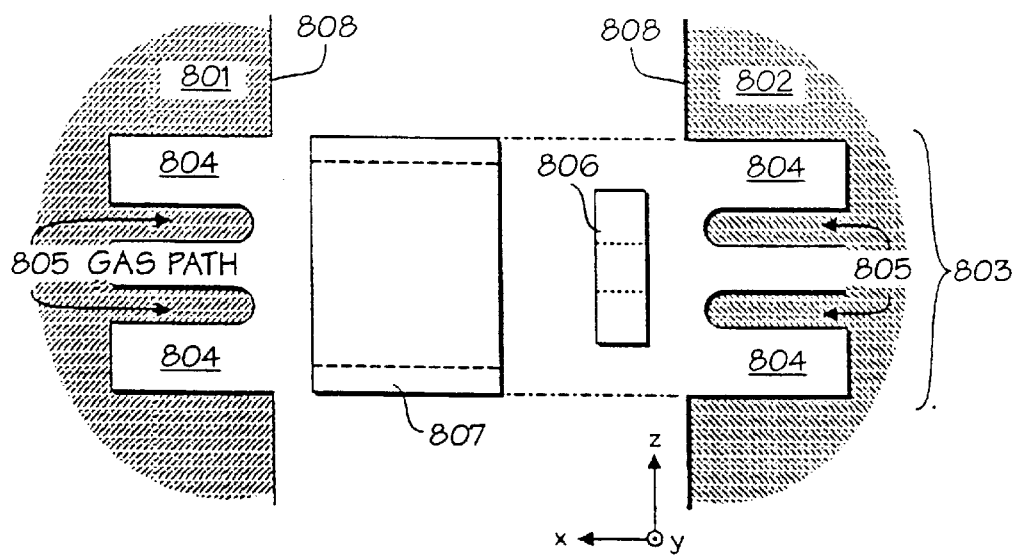
FIG. 8b is an illustration in two dimensions of a sealing port according to the present invention.

FIGS. 8a–8b show another embodiment for the sealing of ports between adjacent base blocks, adjacent base blocks and manifold blocks and adjacent manifold blocks. FIGS. 8a–8b show two base blocks 801 and 802. Although only two conduit ports are shown in FIGS. 8a–8b, this embodiment is applicable to manifold to manifold and manifold to base block couplings as well. Each base block 801, 802 has its conduit port 803 centered on the conduit interconnect face 808. The conduit port 803 has a cylindrical cavity 804, a toroid 805 and a VCR gasket 806 that is shared between the two base blocks. The VCR gasket 806 is made of a malleable material such as Ni that conforms to the surfaces of the toroids 805 of each base block 801, 802 when the base blocks are compressed together. This improves the integrity of the seal between blocks 801, 802. A shear cylinder 807 fits around the toroid 805 and into the cylindrical cavity 804 of both blocks 801, 802. The shear cylinder 807 is typically made of a hard material such as stainless steel. The shear cylinder 807 prevents the relative movement, in the yz plane, of one block with respect to the other block. Such movement, if it were to occur, would destroy the integrity of the seal formed by compressing the VCR gasket 806 between the two toroids 805. Thus the shear cylinder 807 improves the reliability of the seal between blocks 801, 802.

Figure 6A:
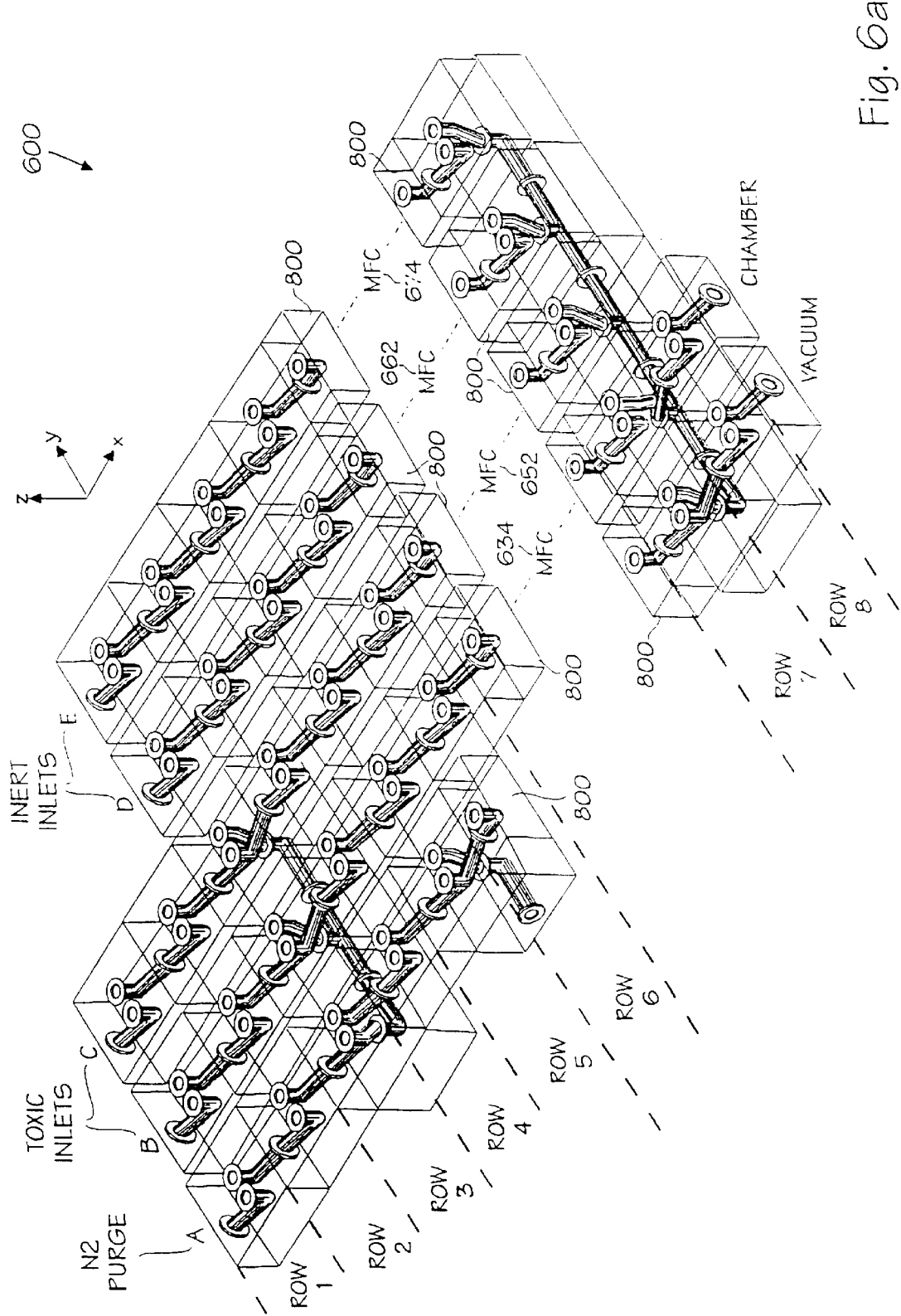
FIG. 6a is an illustration of conduit and manifold routing for a gas panel created by coupling and interconnecting base blocks and manifold blocks.
Figure 6B:
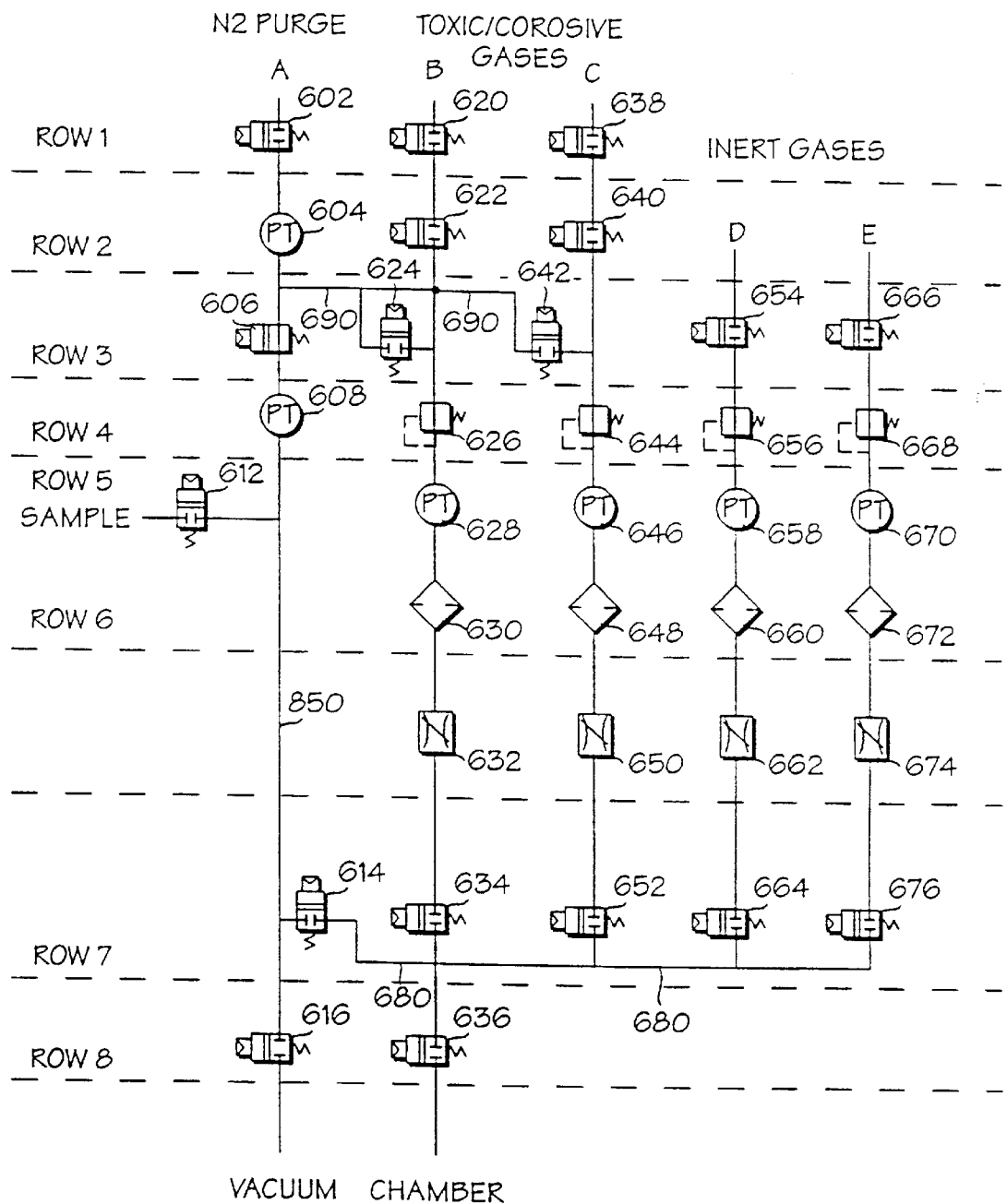
FIG. 6b is a schematic illustration of a gas panel formed when a functional component is attached to the component interconnection face of each block.

FIG. 6a is an example of a conduit and manifold routing matrix for a gas panel 600 created by coupling and interconnecting base blocks 310, 320, 330 and 340 and manifold blocks 510 and 520. FIG. 6b is a schematic illustration of gas panel 600 when functional components are attached to the component interconnection face 360 of each base block.

FIG. 6a shows a gas panel having five different gas sticks A, B, C, D and E. Each gas stick is generated by coupling the conduit interconnection faces of adjacent base blocks along the X axis as shown in FIG. 6a. A first gas stick A, provides a purge gas, such as $N_2$, into the system. A second gas stick B, provides and manipulates a toxic or corrosive gas such as, but not limited to, $SiH_4$, $BCl_3$, or HCl in the gas panel 600. A third gas stick C also provides and manipulates a toxic or corrosive gas in gas panel 600. A fourth gas stick D provides and manipulates an inert gas such as, but not limited to, helium, or argon in gas panel 600, and a fifth gas stick E provides and manipulates a second inert gas in gas panel 600 system.

Purge gas stick A comprises: in Row 1 an isolation base block 310 with a isolation valve 602, in Row 2 an isolation base block 310 with a pressure transducer 604, in Row 3 a US/DS control base block 320 with a pneumatic diaphragm valve 606 placed in a downstream control position, in Row 4 an isolation base block 310 with a pressure transducer 608, in Row 5 a manifold control base block 330 with a pneumatic diaphragm isolation valve 612, and in Row 7 a manifold control block 330 with a pneumatic isolation valve 614 for coupling purge gas to the mix manifold, and in Row 8 an isolation base block 310 with a pneumatic isolation valve 616 for vacuum isolation.

Toxic gas stick B comprises: in Row 1 an isolation base block 310 with a manual diaphragm valve 620 for Lock-out, Tag-out (LOTO) purposes, in Row 2 an isolation base block 310 with a pneumatic isolation valve 622, in Row 3 a manifold control block 330 with a pneumatic isolation valve 624, in Row 4 an isolation base block 310 with a pressure regulator 626, in Row 5 an isolation base block with a pressure transducer 628, in Row 6 an isolation base block 310 with a filter 630, in Row 7 a US/DS control base block 320 in the upstream control position) with a pneumatic valve 634, and in Row 8 an isolation block 310 with a pneumatic isolation valve 636 for providing isolation of a reaction chamber from the mix manifold.

Toxic gas stick C comprises: in Row 1 an isolation base block 310 with a manual diaphragm valve 638 for Lock-out, Tag-out (LOTO) purposes, in Row 2 an isolation base block 310 with a pneumatic isolation valve 640, in Row 3 a manifold control block 330 with a pneumatic isolation valve 642, in Row 4 an isolation base block 310 with a pressure regulator 644, in Row 5 an isolation base block with a pressure transducer 646, in Row 6 an isolation base block 310 with a filter 648, in Row 7 a blind base block 340 with a pneumatic valve 652.

Inert gas sticks D comprises: in Row 3, an isolation base block 310 with a pneumatic valve 654, in Row 4 an isolation base block 310 with a pressure regulator 656, in Row 5 an isolation base block 310 with a pressure transducer 658, in Row 6 an isolation base block with a filter 660, in Row 7 a blind base block 340 with a pneumatic isolation valve 664.

Inert gas sticks E comprises; in Row 3, an isolation base block 310 with a pneumatic valve 666, in Row 4 an isolation base block 310 with a pressure regulator 668, in Row 5 an isolation base block 310 with a pressure transducer 670, and in Row 6 an isolation base block with a filter 672, in Row 7 a blind base block 340 with a pneumatic diaphragm isolation valve 676.

Gas panel 600 includes a common mix manifold 680 in Row 7 formed by attaching manifold blocks together about the manifold interfaces 556 and 562 (along the Y axis). Individual gas sticks A, B, C, D and E are coupled to the common mix manifold 680 by attaching the manifold interconnection faces 390 of base blocks in Row 7 to base interconnection faces 550 of manifold base blocks 510 and 520 so that they are in fluid communication. Mix manifold 680 comprises an elbow manifold block 520 attached to gas stick A and an elbow manifold block 520 attached to gas stick E, and a flow-through manifold block attached to gas sticks B, C and D. It is to be appreciated that the manifold blocks of mix manifold 680 are attached together in a direction transverse to the attachment of base blocks 310, 320, 330 and 340.

Gas panel 600 also includes a purge gas manifold 690 in Row 3 formed by coupling manifold blocks 520, 510 and 520 together about their manifold interconnection faces 566 and 562 along the Y axis of gas panel 600. Purge gas manifold 690 comprises an elbow manifold block 520 attached to gas stick A, a flow-through manifold block 510 coupled to gas stick B, and an elbow manifold 520 coupled to gas stick C. Gas sticks A, B, and C are coupled to purge manifold 690 by attaching the manifold interconnection faces 390 of base blocks in Row 3 of gas sticks A, B and C to the base interconnection face of manifold blocks 520, 510 and 520, respectively, so that they are in fluid communication.

It is to be appreciated that purge gas manifold 690 does not extend to gas sticks D and E because inert gases generally do not require purging. However, if desired, gas sticks D and E can easily be coupled to purge manifold 690 by moving the isolation blocks of sticks D and E in Row 3 to Row 2, and placing manifold base blocks 330 in Row 3 and placing manifold blocks beneath them. Of course, blind manifold block 520 in Row 3 beneath gas stick C would be changed to a flow-through manifold 510.

Shown in FIG. 6a attached to the external conduit interconnections faces of the base blocks of Row 6 and Row 7 are bridge base blocks 800. Bridge base blocks 800 allow for the coupling of a standard mass flow controller to gas panel 600. Bridge base block 800 is shown in FIG. 3e and includes an MFC interconnection face 802. A port 804 is positioned symmetrically about the center of MFC interconnection face 802 and a recess 804 for sealing purposes is formed symmetrically about port 802. Bridge base block 800 also includes a conduit interconnection face 372 which is identical to the conduit interconnection face 372 of base blocks 310, 320, 330 and 340. A passage 808 provides fluid communication between MFC port 804 and conduit port 378. Additionally, bridge base block 800 includes throughholes 722 for bolting to adjacent base blocks.

A standard MFC, such as MFC 455 shown in FIG. 4, can be coupled to bridge base blocks 800 of a particular gas stick. MFC 445 includes an input interconnection face 472 which mates with and aligns to MFC interconnection face 802 of bridge block 800 and includes an output interconnection face 474 which also mates with and aligns to MFC interconnection face 802 of bridge block 800. Positionally aligned threaded throughholes 810 in bridge block 800 and through holes 812 in interfaces 422 and 474 are provided for down mounting MFC 455 to bridge blocks 800.

As an alternative to the use of bridge blocks 800 and MFC interfaces to couple a standard MFC to gas panel 600, the functions of a standard MFC can be broken up into its discrete functions of a flow control valve and a flow meter. In this way, two isolation blocks can be coupled between Row 6 and Row 7 of a gas stick, and the flow control valve and the flow control meter each coupled to a base block. By providing electrical control between the flow control valve and the flow meter, the functions of an MFC can be included into a gas panel without requiring the use of bridge blocks.

Figure 2:
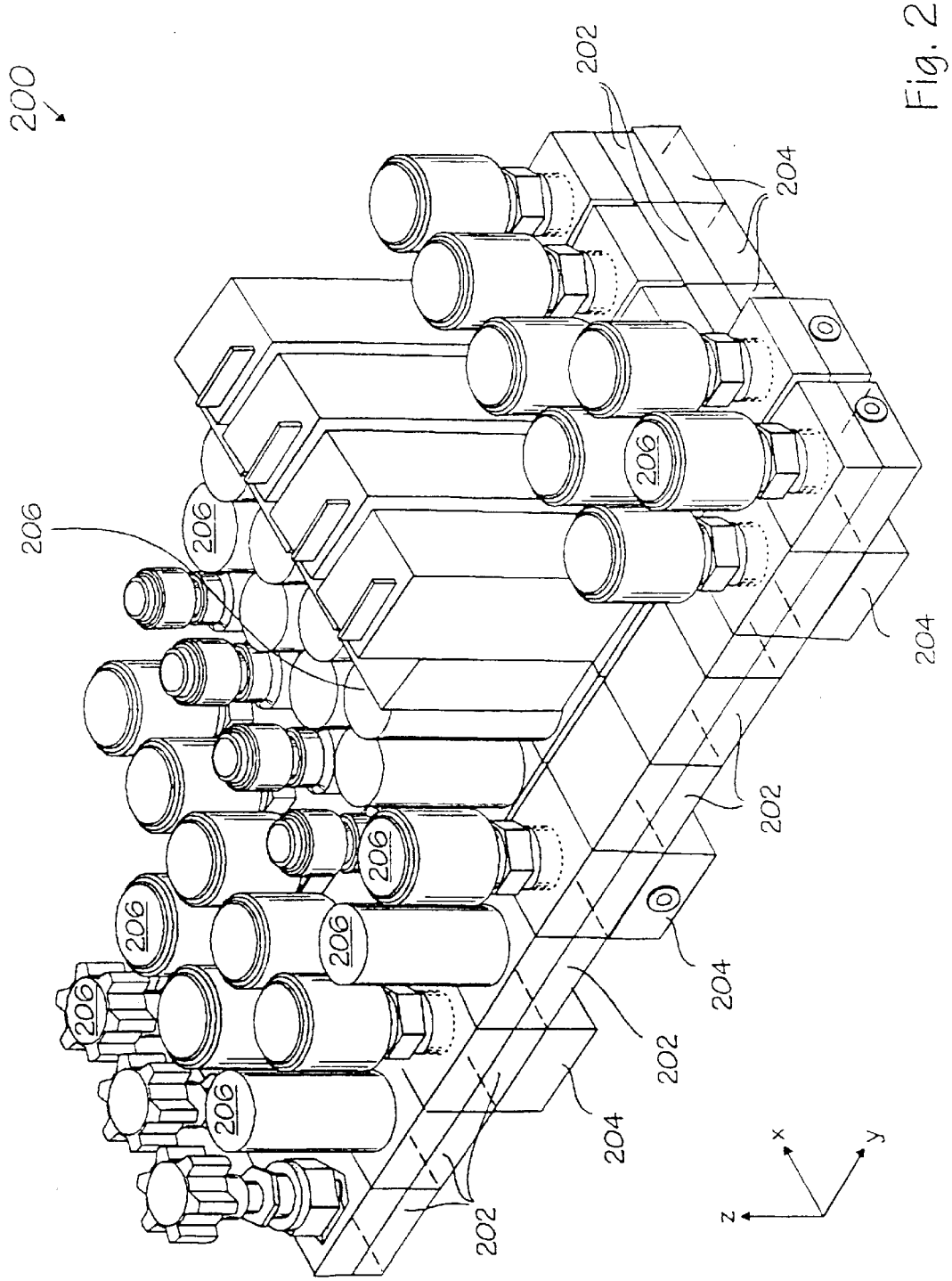
FIG. 2 is an illustration of a novel gas panel comprising the building blocks of the present invention.

In locations where conduit routing is desired, but where no base blocks are provided, such as for routing 850 between Row 5 and Row 7 of purge gas stick A, bridge base blocks 800 can be used to attach a capping assembly having a conduit formed therein to the gas panel. Alternatively, as shown in FIG. 2, serially coupled isolation base blocks 310 can be used to form a conduit. In such a case a capping plate could be down mounted onto the isolation base blocks to provide fluid communication between component ports 362 and 364.

External connections can be made to gas panel 600 by attaching end plates which include, for example, a VCR connection, to the external faces of the input and output face blocks of the gas panel. For example, to input gas into gas panel 600, an end plate can be attached to the external conduit interconnection face 370 of the base blocks of Row 1 of gas sticks A, B and C, and to the conduit interconnection faces 370 of the base blocks of Row 3 of gas sticks D and E. Stainless steel tubing can then be coupled to the VCR connection to route gas to gas panel 600 from gas sources, e.g., a bank of bottles located remotely from gas panel 600. Similarly, to output gas from gas panel 600, end plates can be attached to the external conduit interconnection face 372 of base blocks of sticks A and B in Row 8 in order to couple gas panel 600 by high purity stainless steel tubing to a vacuum source and to a reaction or processing chamber, respectively. A similar end plate could be coupled to manifold block 520 in Row 5 of gas stick A in order to allow the input or output of gas to and from gas panel 600 in a direction transverse to the input and output direction of the base blocks.

End plates 560 and 570 are shown in FIGS. 5f and 5g, respectively. The present invention employs two types of end plates: 1) a straight through end plate 560, shown in FIG. 5f, that provides a straight through connection between the gas stick or manifold passage 561 and the external connection 562 and 2) an elbow end plate 570, shown in FIG. 5g that provides a 90 degree turn in the gas passage so that the gas flow of the gas stick or manifold passage 561 and the gas flow of the external connection 562 are at right angles with one another. The preferred embodiment of the elbow end plate 570 couples the external system at the top 571 (as opposed to either side) of the end plate. One port of each end plate is the port interface common to all blocks along the gas stick or manifold passage and the other port of each end plate is any industry standard fitting that will properly couple to the external system.

As shown in FIG. 6a, base blocks are attached together to form a common conduit or passage in which gas flow is generally along a first direction or axis (X axis). Additionally, manifold blocks are attached together to form a common passage in which gases flow is in a direction transverse or perpendicular (Y axis) to the flow of gas through the coupled base blocks. By appropriately coupling manifold and base blocks together, gas can be routed as desired to any location in the gas panel.

Additionally, it is to be appreciated that when the base blocks and manifold blocks are appropriately assembled, they form and constitute all gas conduits required for a gas control panel whereas the function components, through common interface 360, complete the gas pathing at interface 360 only for the purpose of providing the functionality for which they are desired, e.g., filtration, regulation, valving, etc.

Generally, a gas panel formed from the blocks of the present invention will be incorporated into a piece of manufacturing equipment where high precision and complex gas control is necessary, such as in semiconductor equipment manufacturing. The present invention is ideally suited for use in semiconductor equipment, such as but not limited to, chemical vapor deposition (CVD) reactors, reactive ion etchers (RIE), ion implanters, etc. The gas panel of the present invention is ideally suited for use in the manufacture of high density semiconductor integrated circuits, such as microprocessors and DRAMS, where ultra clean gases are necessary and where gas flows and mixtures must be precisely controlled.

In a typical manufacturing operation gas panel 600 will be used to provide a gas or a mixture of gases into a reaction chamber. In an operational mode isolation valves 602, 620, 638, 654, 666, 622 and 640 could be open while purge valves 624 and 642 in gas sticks B and C, respectively, and valve 606 are closed, as are sample valves 612, vacuum valve 616 and valve 614. In this way, gas can flow down respective gas sticks (i.e., flow down through attached base blocks) wherein the pressure is monitored, regulated, the gases filtered, and the flow rate controlled. The mix isolation valves 634, 652, 664 and 636 of those gases which are to be included in the gas mix are open so that they can flow into mix manifold 680. Gas from the respective gas sticks flow through the coupled manifold blocks in a direction transverse to the direction of flow in the coupled base blocks. The gas mix in mix manifold 680 then flows out through chamber isolation valve 636 to the reaction chamber where it can be used to process a device (e.g., deposit a film, etch a film, etc.).

It is generally desirable to first vent off a gas or gas mix prior to flowing gas into a reaction chamber in order to obtain a steady state flow. To vent gas off of gas panel 600, gas panel 600 is placed in the operational mode except that chamber isolation valve 636 is closed and vacuum valve 616 and valve 614 are open. In this way gas is fed from the individual gas sticks into mix manifold 680 and out to the vacuum source through vacuum valve 616 until a steady flow rate in obtained.

In order to purge gas sticks, components and manifolds toxic or corrosive gases of gas panel 600, isolation valves 622 and 640 are closed, as are chamber isolation valve 636 and valve 606. The purge valves 624 and 642 and the mix valves 634 and 652 of those gas sticks to be purged are opened, as are vacuum valve 616 and valve 614. In this way purge gas flows down through the base blocks of gas stick A and into purge gas manifold 690. Purge gas then flows through the attached manifold blocks, in a direction transverse to the flow of gas through coupled base blocks (gas sticks) and into gas sticks B and C through purge gas valve 624 and 642, respectively. Purge gas then flows down through respective gas sticks and attached components. Purge gas then flows through the mix valves and into the mix manifold 680 and out valve 614 and vacuum valve 616 to a vacuum source. Purging is continued in this manner until particles or contamination is reduced to a desired level.

At times it may be desirable to sample a gas mix for contaminants or gas concentrations. In such a case a sample can be taken from gas panel 600 through an external connection coupled to elbow manifold block 520 attached to base block 330 in Row 5 of gas stick A. In order to sample gas from gas panel 600, gas panel 600 is placed in the operational mode except chamber isolation valve 636 is closed and valve 614 is opened. Additionally, sample isolation valve 612 is also open. In this way, gas flows down respective gas sticks into mix manifold 680 through valves 614 and up conduit 850 of gas stick A and out sample valve 612. Additionally, manifold block 520 in Row 5 of gas stick A can be coupled to a helium leak detector to preform installation and post maintenance seal integrity testing with appropriate manipulation of isolation valves. Additionally, it is to be noted that as shown in FIGS. 6a and 6b, manifold blocks can be used to provide external input and output connections for a gas panel in a direction transverse to input and output connections made to base blocks. In this way, gas panels of the present invention provide flexibility for attachment into systems and equipment.

Thus, a novel set of base blocks and manifold blocks have been described which can be coupled together to easily configure high purity, complex gas panels and systems. The building blocks of the present invention greatly reduce the time necessary to design and manufacture gas panels. It is to be appreciated that by interconnecting the blocks of the present invention, weldless and tubeless gas panels can be fabricated which are ideal for use in "ultra clean" manufacturing equipment where reduced contamination levels are essential.

Additionally, as is readily apparent from the example shown in FIG. 6a, the base blocks and manifold blocks of the present invention provide all gas routing in the gas panel. That is, all functional passage routing is done in the base blocks and manifold blocks. No functional routing, except for simple input and output, is done in the functional components or their transition interfaces. In this way, the base blocks and manifold blocks of the present invention combine together to provide all of the functional routing for the interconnection of the functional components.

The porting and routing of each of the individual base blocks have been specifically designed so that when combined with the other base blocks, the greatest flexibility is provided to configure the greatest number of different gas panels utilizing the minimum number of different blocks. By reducing the number of different blocks necessary to configure different gas panels, inventory costs are substantially reduced. Additionally, the symmetrical nature of the base blocks and manifold blocks allows each block to be used bidirectionally, and thereby provide increased functionality. Still further, the specific design and placement of passages and throughholes in the base blocks of the present invention maximize the functionality of each block while minimizing block size, thereby enabling the configuring of dense gas panels with reduced or minimized footprints and entrained volume.

Additionally, by down mounting functional components to the base blocks of the present invention, one can easily remove each functional component for repair or replacement without affecting the integrity of the attachment of the base blocks and manifold blocks. The novel set of blocks of the present invention greatly simplify the design, construction, maintenance, repair, and reconfiguration of gas panels.

Thus, a novel set of blocks have been described which allow the flexible configuration of weldless and tubeless gas panels.

We claim:

1. A gas panel comprising a plurality of interconnected blocks comprising:
   a first block comprising:
      a first face;
      a second face adjacent to said first face;
      a third face opposite said second face;
      a fourth face opposite said first face;
      a first port and a second port formed in said first face, said first port and said second port having a first position relationship;
      a third port formed in said second face;
      a fourth port formed in said third face;
      a first passage coupling said first port to said third port; and
      a second passage coupling said second port to said fourth port;
   a second block comprising;
      a first face;
      a second face adjacent to said first face;
      a third face opposite said second face;
      a fourth face opposite said first face;
      a first port and a second port formed in said first face, said first port and said second port having said first positional relationship;
      a third port formed in said second face;
      a fourth port formed in said third face;
      a fifth port formed in said fourth face;
      a first passage coupling said first port to said third port; and
      a second passage coupling said second port, said fourth port, and said fifth port;
   a third block comprising;
      a first face;
      a second face adjacent to said first face;
      a third face opposite said second face;
      a fourth face opposite said first face;
      a first port, a second port and a third port formed in said first face, said first port, second port and third port having a second positional relationship;
      a fourth port formed in said second face;
      a fifth port formed in said third face;
      a sixth port formed in said fourth face;
      a first passage coupling said fifth port and said third port;
      a second passage coupling said sixth port and said second port; and
      a third passage coupling said fourth port and said first port;
   a fourth block comprising;
      a first face;
      a second face adjacent to said first face;
      a third face opposite said second face;
      a fourth face opposite said first face;
      a first port and a second port formed in said first face, said first port and said second port having said first positional relationship;
      a third port formed in said second face;
      a fourth port formed in said fourth face;
      a first passage coupling said first port, said third port; and
      a second passage coupling said second port to said fourth port.

2. The gas panel of claim 1 further comprising:
   a fifth block, said fifth block comprising:
      a first face;
      a second face, said second face adjacent to said first face;
      a first port formed in said first face;
      a second port formed in said second face;
      a passage connecting said first port with said second port.

3. The gas panel of claim 1 further comprising:
   a sixth block, said sixth block comprising:
      a first face;
      a second face, said second face adjacent to said first face;
      a third face, said third face opposite said second face;
      a first port formed in said first face;
      a second port formed in said second face;
      a third port formed in said third face;
      a passage connecting said first port, said second port, and said third port.

4. The gas panel of claim 1 further comprising:
   a seventh block, said seventh block comprising:
      a first face;
      a second face, said second face adjacent to said first face;
      a first port formed in said first face;
      a second port formed in said second face;
      a passage connecting said first port with said second port; and wherein said first face of said seventh block has a greater surface area than said first face of said fifth block.

5. The gas panel of claim 1 wherein said first face of said first block, said first face of said second block, and said first face of said fourth block are identical.

6. The gas panel of claim 1 wherein said second face and said third face of said first block, said second face and said third face of said second block, and said second face and said third face of said third block are all identical.

7. The gas panel of claim 1 wherein said first port configuration further comprises said first port and said second port of said first block, said first port and said second port of said second block and said first port and said second port of said fourth block positioned such that said second port is centered upon said first face and said first port is centered 0.315 inches from the center of said second port.

8. The gas panel of claim 1 wherein said third port and said fourth port of said first block, said third port and said fourth port of second block, said fourth port and said fifth port of said third block are each positioned symmetrically about said second face and said third face, respectively.

9. The gas panel of claim 1 further comprising a first end plate, said first end plate coupled to a gas stick or manifold passage, said first end plate providing a straight through coupling of said gas stick or manifold passage to an external gas system.

10. The gas panel of claim 1 further comprising a second end plate, said second end plate coupled to a gas stick or manifold passage, said second end plate providing a right angle coupling of said gas stick or manifold passage to an external gas system.

11. The gas panel of claim 1 further comprising an eighth block, said eighth block comprising:
a first face;
a second face, said second face adjacent to said first face;
a third face, said third face opposite said second face;
a first port and a second port formed in said first face;
a third port formed in said second face;
a fourth port formed in said third face;
a passage connecting said first port, said second port, and said fourth port.

12. The gas panel of claim 1 further comprising a ninth block, said ninth block comprising:
a first face;
a second face, said second face adjacent to said first face;
a third face, said third face opposite said second face;
a first port and a second port formed in said first face;
a third port formed in said second face;
a fourth port formed in said third face;
a passage connecting said first port, said second port, said third port and said fourth port.

13. The gas panel of claim 1 further comprising a tenth block, said tenth block comprising:
a first face;
a second face, said second face adjacent to said first face;
a third face, said third face opposite said second face;
a first port formed in said second face;
a second port formed in said third face;
a passage connecting said first port and said second port.

14. A building block for a modular gas system, said building block comprising:
a first face;
a second face adjacent to said first face;
a third face opposite said second face;
a fourth face opposite said first face;
a first port, a second port and a third port formed in said first face, said first port, second port and third port having a positional relationship;
a fourth port formed in said second face;
a fifth port formed in said third face;
a sixth port formed in said fourth face;
a first passage coupling said fifth port and said third port;
a second passage coupling said sixth port and said second port;
a third passage coupling said fourth port and said first port;
a functional component mounted to said first face of said building block, said functional component providing a direct fluid communication path between said first and said third ports of said building block and said functional component providing a valve between said second port of said building block and said direct fluid communication path.

15. The building block of claim 14 wherein said functional component further comprises a first, second and third port, each of said ports of said functional component mated to only one of said ports of said first face of said building block.

16. The building block of claim 14 wherein said functional component further comprises one port, said port surrounding all three of said ports of said first face of said building block, said building block having a recessed cavity on said first face, said functional component located within said recessed cavity.

17. A set of modular building blocks comprising:
an isolation base block;
an upstream control base block;
a downstream control base block;
a manifold control base block;
a blind base block;
a flow through manifold block; and
an elbow manifold block.

18. The set of modular building blocks of claim 17 wherein said upstream control base block and said downstream control base block are the same physical block wherein the upstream control capability and the downstream control capability are dependent upon the orientation of said physical block.

19. An apparatus, comprising:
a) at a region of coupling between two building blocks, a shear element that improves the reliability of a fluid communication seal between said building blocks, said shear element surrounding said fluid communication channel and inserted in a cavity, said cavity formed in both of said building blocks; and
b) at said region of coupling between two building blocks, a malleable gasket that improves the integrity of said fluid communication seal.

20. The apparatus of claim 19 wherein said cavity is a cylindrical cavity.

21. The apparatus of claim 20 wherein said shear element is a shear cylinder.

22. The apparatus of claim 19 wherein said malleable gasket is further comprised of Nickel.

23. The apparatus of claim 19 wherein said shear element is further comprised of steel.

24. A gas system comprising:
- at least one conduit line and at least one manifold line, said conduit line having a plurality of conduit line ports formed at the interface of neighboring base blocks, said manifold line having a plurality of manifold line ports formed at the interface of neighboring manifold blocks, said manifold line having a plurality of base ports for fluid communication with one or more of said conduit lines, said conduit line having a plurality of functional component ports for fluid communication with one or more functional components;
- an isolation base block, said isolation base block having first and second functional component ports, said isolation base block having a passage that couples a first conduit line port and said first functional component port, said isolation base block having a passage that couples a second conduit line port and said second functional component port;
- an upstream/downstream base block, said upstream/downstream base block having third and fourth functional component ports, said upstream/downstream base block having a passage that couples a third conduit line port, said third functional component port and a first base port, said upstream/downstream base block having a passage that couples a fourth conduit line port and said fourth functional component port;
- a manifold control base block, said manifold control base block having fifth, sixth and seventh functional component ports, said manifold control base block having a passage that couples a fifth conduit line port and said fifth functional component port, said manifold control base block having a passage that couples a second base port and said sixth functional component port, said manifold control base block having a passage that couples a sixth conduit line port and a seventh functional component port; and
- a blind base block, said blind base block having eighth and ninth functional component parts, said blind base block having a passage that couples a third base port and said eighth functional component port, said blind base block having a passage that couples a seventh conduit line port and said ninth functional component port.

25. The apparatus of claim 24 further comprising a functional component mounted to said isolation base block.

26. The apparatus of claim 25 wherein said functional component is a regulator.

27. The apparatus of claim 25 wherein said functional component is a filter.

28. The apparatus of claim 25 wherein said functional component is a pressure transducer.

29. The apparatus of claim 25 wherein said functional component is a valve.

30. The apparatus of claim 24 further comprising a functional component mounted to said upstream/downstream base block.

31. The apparatus of claim 30 wherein said functional component is a regulator.

32. The apparatus of claim 30 wherein said functional component is a filter.

33. The apparatus of claim 30 wherein said functional component is a pressure transducer.

34. The apparatus of claim 30 wherein said functional component is a valve.

35. The apparatus of claim 24 further comprising a functional component mounted to said manifold control block.

36. The apparatus of claim 35 wherein said functional component further comprises a valve over said sixth functional component port.

37. The apparatus of claim 35 wherein said functional component is a housing over said manifold control block, said manifold control block having an integrated valve over said sixth functional component port.

38. The apparatus of claim 24 further comprising a functional component mounted to said blind base block.

39. The apparatus of claim 38 wherein said functional component is a regulator.

40. The apparatus of claim 38 wherein said functional component is a filter.

41. The apparatus of claim 38 wherein said functional component is a pressure transducer.

42. The apparatus of claim 38 wherein said functional component is a valve.

43. A fluid system, comprising:
- one or more conduit lines and one or more manifold lines, said one or more conduit lines at least partially formed by the placement of neighboring blocks, said one or more manifold lines at least partially formed by the placement of neighboring blocks, said one or more manifold lines having a plurality of base ports for fluid communication with said one or more conduit lines, said one or more conduit lines having a plurality of functional component ports for fluid communication with various functional components, at least some of said functional component ports in fluid communication with one another according to passages within said gas system, said passages including:
- a first passage that couples a first component port to a second component port;
- a second passage that couples a third component port to a fourth component port and a first base port; and
- a third passage that couples a fifth component port to a second base port.

44. A module for use within a fluid system, said fluid system comprising at least one conduit line and at least one manifold line, said conduit line at least partially formed by the placement of neighboring modules, said manifold line having a plurality of manifold line ports formed at the interface of neighboring manifold modules, said manifold line having a plurality of base ports for fluid communication with one or more of said conduit lines, said conduit line having a plurality of functional component ports for fluid communication with one or more functional components, said modules comprising:
- a) first and second functional component ports;
- b) a first passage for coupling a first conduit line port to said first functional component port; and
- c) a second passage for coupling a second conduit line port to said second functional component port.

45. A module for use within a fluid system, said fluid system comprising at least one conduit line and at least one manifold line, said conduit line at least partially formed by the placement of neighboring modules, said manifold line having a plurality of manifold line ports formed at the interface of neighboring manifold modules, said manifold line having a plurality of base ports for fluid communication with one or more of said conduit lines, said conduit line having a plurality of functional component ports for fluid communication with one or more functional components, said module comprising:
- a) first and second functional component ports;

b) a first passage for coupling a first conduit line port and a first base port to said first functional component port; and c) a second passage for coupling a second conduit line port to said second functional component port.

46. A module for use within a fluid system, said fluid system comprising at least one conduit line and at least one manifold line, said conduit line at least partially formed by the placement of neighboring modules, said manifold line having a plurality of manifold line ports formed at the interface of neighboring manifold modules, said manifold line having a plurality of base ports for fluid communication with one or more of said conduit lines, said conduit line having a plurality of functional component ports for fluid communication with one or more functional components, said module comprising:

a) first and second functional component ports;

b) a first passage for coupling a first conduit line port and a second conduit line port to said first functional component port; and c) a second passage for coupling a base port to said second functional component port.

47. A module for use within a fluid system, said fluid system comprising at least one conduit line and at least one manifold line, said conduit line at least partially formed by the placement of neighboring modules, said manifold line having a plurality of manifold line ports formed at the interface of neighboring manifold modules, said manifold line having a plurality of base ports for fluid communication with one or more of said conduit lines, said conduit line having a plurality of functional component ports for fluid communication with one or more functional components, said module comprising:

a) first and second functional component ports;

b) a first passage for coupling a base port to said first functional component port; and c) a second passage that couples a conduit line port to said second functional component port.

48. An apparatus, comprising:

a gas panel comprising a conduit and a manifold, said conduit having a first passage within a first block, said first passage continued by the placement of an adjacent block next to said first block such that a conduit port of said first block is in fluid communication with an adjacent conduit port of said adjacent block, said conduit having a second passage within a second block, said second passage in fluid communication with said manifold by the placement of a manifold block next to said second block such that a base port is in fluid communication with a manifold port, said manifold block having said base port for fluid communication with said conduit, said second block having said manifold port for fluid communication with said manifold.

49. The gas panel of claim 48 wherein said first passage provides fluid communication between said conduit port and a functional component port located on said first block.

50. The gas panel of claim 49 further comprising a functional component in fluid communication with said functional component port.

51. The gas panel of claim 50 wherein said functional component is a regulator.

52. The gas panel of claim 50 wherein said functional component is a filter.

53. The gas panel of claim 50 wherein said functional component is a pressure transducer.

54. The gas panel of claim 50 wherein said functional component is a valve.

55. The gas panel of claim 48 wherein said second passage provides fluid communication between said manifold port and a functional component port located on said second block.

56. The gas panel of claim 55 further comprising a functional component in fluid communication with said functional component port.

57. The gas panel of claim 56 wherein said functional component is a regulator.

58. The gas panel of claim 56 wherein said functional component is a filter.

59. The gas panel of claim 56 wherein said functional component is a pressure transducer.

60. The gas panel of claim 56 wherein said functional component is a valve.

61. The gas panel of claim 48 wherein said first block and said second block are the same block and said first passage and said second passage are the same passage, said first passage and said second passage providing fluid communication between said conduit port, said manifold port and a functional component port located on said first and second block.

62. The gas panel of claim 61 further comprising a functional component in fluid communication with said functional component port.

63. The gas panel of claim 62 wherein said functional component is a regulator.

64. The gas panel of claim 62 wherein said functional component is a filter.

65. The gas panel of claim 62 wherein said functional component is a pressure transducer.

66. The gas panel of claim 62 wherein said functional component is a valve.

67. The gas panel of claim 48 wherein said manifold block has a second manifold port for continuing said manifold by the placement of a second manifold block next to said manifold block such that said second manifold port is in fluid communication with a third manifold port, said second manifold block having said third manifold port.

68. A block for use in a gas panel, comprising.

a body;

a conduit port;

a functional component port; and a passage within the body providing fluid communication between the conduit port and the functional component port;

wherein the conduit port is constructed and arranged such that placement of an adjacent block having an adjacent block body, an adjacent block passage within the adjacent block body, and an adjacent block conduit port in fluid communication with the conduit port, fluidly connects the functional component port to the adjacent block passage.

69. The block of claim 68, wherein the functional component port has a standard interface that provides fluid communication to a functional component that couples to the functional component port, and wherein the functional component is one of a plurality of functional components that couple to the functional component port, each of said plurality of functional components having a different function.

70. The block of claim 69 wherein one of said plurality of functional components is a regulator.

71. The block of claim 69 wherein one of said plurality of functional components is a filter.

72. The block of claim 69 wherein one of said plurality of functional components is a pressure transducer.

73. The block of claim 69 wherein one of said plurality of functional components is a valve.

74. The block of claim 68, wherein the passage is a first passage, the block further comprising a second passage within the body.

75. The block of claim 74, wherein the conduit port is a first conduit port and the functional component port is a first functional component port, the block further comprising:
   a second conduit port; and
   a second functional component port fluidly interconnected to the second conduit port by the second passage.

76. A block for use in a gas panel, comprising:
   a body;
   a manifold port;
   a functional component port; and
   a passage within the body providing fluid communication between the manifold port and the functional component port;
   wherein the manifold port is constructed and arranged such that placement of an adjacent manifold block having a manifold body, a manifold passage within the manifold body and a base port in fluid communication with the manifold port, fluidly connects the functional component port to the manifold passage.

77. The block of claim 76, wherein the functional component port has a standard interface that provides fluid communication to a functional component that couples to the functional component port, and wherein the functional component is one of a plurality of functional components that couple to said functional component port, each of said plurality of functional components having a different function.

78. The block of claim 77 wherein one of said plurality of functional components is a regulator.

79. The block of claim 77 wherein one of said plurality of functional components is a filter.

80. The block of claim 77 wherein one of said plurality of functional components is a pressure transducer.

81. The block of claim 77 wherein one of said plurality of functional components is a valve.

82. The block of claim 76, wherein the passage is a first passage, the block further comprising a second passage within the body.

83. The block of claim 82, wherein the conduit port is a first conduit port and the functional component port is a first functional component port, the block further comprising:
   a second conduit port; and
   a second functional component port fluidly interconnected to the second conduit port by the second passage;
   wherein the second conduit port is constructed and arranged such that placement of an adjacent block having an adjacent block body, an adjacent block passage within the adjacent block body, and an adjacent block conduit port in fluid communication with the second conduit port fluidly connects the second functional component port to the adjacent block passage.

84. A block for use in a gas panel, comprising:
   a body;
   a conduit port;
   a manifold port;
   a functional component port;
   a passage within the body providing fluid communication among the conduit port, the manifold port, and the functional component port;
   wherein the conduit port is constructed and arranged such that placement of an adjacent block having an adjacent block body, an adjacent block passage within the adjacent block body, and an adjacent block conduit port in fluid communication with the conduit port fluidly connects the functional component port to the adjacent block passage; and
   wherein the manifold port is constructed and arranged such that placement of an adjacent manifold block having a manifold body, a manifold passage within the manifold body and a base port in fluid communication with the manifold port fluidly connects the functional component to the manifold passage.

85. The block of claim 84, wherein functional component port has a standard interface that provides fluid communication to a functional component that couples to said functional component port, and wherein the functional component is one of a plurality of functional components, each of said plurality of functional components having a different function.

86. The block of claim 85 wherein one of said plurality of functional components is a regulator.

87. The block of claim 85 wherein one of said plurality of functional components is a filter.

88. The block of claim 85 wherein one of said plurality of functional components is a pressure transducer.

89. The block of claim 85 wherein one of said plurality of functional components is a valve.

90. The block of claim 84, wherein the passage is a first passage, the block further comprising a second passage within the body.

91. The block of claim 94 wherein the conduit is a first conduit and the functional component port is a first functional component port, the block further comprising:
   a second conduit port; and
   a second functional component port fluidly interconnected to the second conduit port by the second passage;
   wherein the second conduit port is constructed and arranged such that placement of a second adjacent block having a second adjacent block body, a second adjacent block passage within the second adjacent block body, and a second adjacent block conduit port in a fluid communication with the second conduit port, fluidly connects the second functional component port to the second adjacent block passage.

92. A block for use in a gas panel comprising:
   body;
   a first conduit port;
   a second conduit port; and
   a passage within the body providing fluid communication between the conduit port and the second conduit port;
   wherein the first conduit port is constructed and arranged such that placement of an adjacent block having an adjacent block body, an adjacent block passage within the adjacent block body, and an adjacent block conduit port in fluid communication with the first conduit port, fluidly connects the second conduit port and the adjacent block passage; and
   wherein the second conduit port is constructed and arranged such that placement of a second adjacent block having a second adjacent block body, a second adjacent block passage within the second adjacent block body, and a second adjacent block conduit port in fluid communication with the second conduit port fluidly connects the first conduit port and the second adjacent block passage.

93. The block of claim 92, wherein the functional component port has a standard interface that provides fluid communication to a functional component that couples to the functional component port, and wherein the functional component is one of a plurality of functional components, each of said plurality of functional components having a different function.

94. The block of claim 93 wherein one of said plurality of functional components is a regulator.

95. The block of claim 93 wherein one of said plurality of functional components is a filter.

96. The block of claim 93 wherein one of said plurality of functional components is a pressure transducer.

97. The block of claim 93 wherein one of said plurality of functional components is a valve.

98. The block claim 92 wherein the passage is a first passage, the block further comprising a second passage within the body.

99. The block claim 98, further comprising:

a manifold port; and a functional component port fluidly interconnected to the manifold port by the second passage;

wherein the manifold port is constructed and arranged such that placement of a manifold block having a manifold body, a manifold passage within the manifold body and a base port in fluid communication with the manifold port, fluidly connects the functional component to the manifold passage.

* * * * *

UNITED STATES PATENT AND TRADEMARK OFFICE
CERTIFICATE OF CORRECTION

PATENT NO.    : 6,302,141 B1                                              Page 1 of 1
DATED         : October 16, 2001
INVENTOR(S)   : Jeffrey R. Markulec, Dennis G. Rex, Richard E. Schuster and Brent D. Elliot It is certified that error appears in the above-identified patent and that said Letters Patent is hereby corrected as shown below:

<u>Column 26,</u>
Line 32, after the word "claim" delete "94" and insert -- 90 --.

Signed and Sealed this

Third Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,302,141 B1  
DATED : October 16, 2001  
INVENTOR(S) : Jeffrey R. Markulec et al.

It is certified that error appears in the above-identified patent and that said Letters Patent is hereby corrected as shown below:

Drawings,
Fig. 3h, delete reference numeral "341" and insert numeral -- 331 --.

Column 20,
Line 54, after the word "surrounding" delete "said" and insert -- a --;

Column 25,
Line 45, after the number "82," delete "wherein the conduit port is" and insert -- further comprising --;
Line 46, after the phrase "conduit port and," insert -- wherein --;

Column 26,
Line 13, after the word "component" insert the word -- port --;
Lines 32 and 33, after the word "conduit" insert the word -- port --;
Line 49, before the word "body" insert the word -- a --;
Line 54, after the phrase "between the" insert the word -- first --;

Column 27,
Line 3, after the number "92," delete "wherein the" and insert -- further comprising a --;

Column 28,
Lines 1 and 4, after the word "block" insert -- of --.

Signed and Sealed this

Seventeenth Day of May, 2005

JON W. DUDAS
*Director of the United States Patent and Trademark Office*